United States Patent
Michiels et al.

(10) Patent No.: US 8,479,016 B2
(45) Date of Patent: Jul. 2, 2013

(54) METHOD AND SYSTEM FOR OBFUSCATING A CRYPTOGRAPHIC FUNCTION

(75) Inventors: Wilhelmus Petrus Adrianus Johannus Michiels, Eindhoven (NL); Paulus Mathias Hubertus Mechtildis Antonius Gorissen, Eindhoven (NL)

(73) Assignee: Irdeto B.V. (NL)

( * ) Notice: Subject to any disclaimer, the term of this patent is extended or adjusted under 35 U.S.C. 154(b) by 1075 days.

(21) Appl. No.: 12/282,175

(22) PCT Filed: Feb. 28, 2007

(86) PCT No.: PCT/IB2007/050640
§ 371 (c)(1),
(2), (4) Date: Sep. 9, 2008

(87) PCT Pub. No.: WO2007/105126
PCT Pub. Date: Sep. 20, 2007

(65) Prior Publication Data
US 2009/0158051 A1    Jun. 18, 2009

(30) Foreign Application Priority Data

Mar. 10, 2006  (EP) ..................................... 06110974
Jul. 6, 2006   (EP) ..................................... 06116693
Jul. 12, 2006  (EP) ..................................... 06117036
Feb. 20, 2007  (EP) ..................................... 07102674

(51) Int. Cl.
*G06F 21/00* (2006.01)

(52) U.S. Cl.
USPC ............................................................ 713/189

(58) Field of Classification Search
None
See application file for complete search history.

(56) References Cited

U.S. PATENT DOCUMENTS

| | | | |
|---|---|---|---|
| 2005/0071653 A1 | 3/2005 | De Jong | |
| 2006/0002548 A1* | 1/2006 | Chu | .............................. 380/28 |
| 2006/0050887 A1* | 3/2006 | Chen | ............................ 380/270 |

FOREIGN PATENT DOCUMENTS

| | | |
|---|---|---|
| EP | 1646174 A1 | 4/2006 |
| FR | 2792141 A1 | 10/2000 |
| WO | 9967918 A2 | 12/1999 |
| WO | 2005060147 A1 | 6/2005 |
| WO | 2006046187 A1 | 5/2006 |

OTHER PUBLICATIONS

Link H E et al: "Clarifying Obfuscation: Improving the Security of White-Box DES" Information Technology: Coding and Computing, 2005. ITCC 2005. International Conference on Las Vegas, NV, USA 04-06 Apr. 4, 2005, IEEE, pp. 679-684, XP010795928.

(Continued)

*Primary Examiner* — Shaun Gregory
(74) *Attorney, Agent, or Firm* — Hayes Soloway P.C.

(57) ABSTRACT

A method of protecting an integrity of a data processing system. The method comprises determining (902) a data string to be protected, an integrity of the data string being an indication of the integrity of the data processing system. Computing (904) a set of parameters representing a predetermined data processing function, using a redundancy in the set of parameters to incorporate the data string into a bit representation of the set of parameters. Enabling (906) the system to process data according to the set of parameters. The set of parameters represents at least part of a cryptographic algorithm including a cryptographic key. The set of parameters represents a network of look-up tables. The network of look-up tables comprises a plurality of look-up tables of a white-box implementation of a data processing algorithm. The data processing algorithm comprises a cryptographic algorithm.

21 Claims, 15 Drawing Sheets

OTHER PUBLICATIONS

Stanley Chow, et al: A White-Box DES Implementation for DRM Application, Digital Rights Management, Pre-proceedings for ACM CCS-9 Workshop, Washington, DC, USA, Nov. 18, 2002, DRM-2002, pp. 1-16.

Stanley Chow, et al: White-Box Cryptography and an AES Implementation, 9th Annual International Workshop, SAC 2002, St. John's Newfoundland, Canada Aug. 15-16, 2002, pp. 1-18.

* cited by examiner

METHOD AND SYSTEM FOR OBFUSCATING A CRYPTOGRAPHIC FUNCTION

FIELD OF THE INVENTION

The invention relates to protecting the integrity of a data processing system.

BACKGROUND OF THE INVENTION

The Internet provides users with convenient and ubiquitous access to digital content. Because of the potential of the Internet as a powerful distribution channel, many consumer electronics (CE) products strive to directly access the Internet or to interoperate with the PC platform—the predominant portal to the Internet. The CE products include, but are not limited to, digital set top boxes, digital TVs, game consoles, PCs and, increasingly, hand-held devices such as PDAs, mobile phones, and mobile storage and rendering devices, such as Apple's iPod. The use of the Internet as a distribution medium for copyrighted content creates the compelling challenge to secure the interests of the content provider. In particular it is required to warrant the copyrights and business models of the content providers. Increasingly, CE platforms are operated using a processor loaded with suitable software. Such software may include the main part of functionality for rendering (playback) of digital content, such as audio and/or video. Control of the playback software is one way to enforce the interests of the content owner including the terms and conditions under which the content may be used. Where traditionally many CE platforms (with the exception of a PC and PDA) used to be closed, nowadays more and more platforms at least partially are open. In particular for the PC platform, some users may be assumed to have complete control over the hardware and software that provides access to the content and a large amount of time and resources to attack and bypass any content protection mechanisms. As a consequence, content providers must deliver content to legitimate users across a hostile network to a community where not all users or devices can be trusted.

Typically, digital rights management systems use an encryption technique based on block ciphers that process the data stream in blocks using a sequence of encryption/decryption steps, referred to as rounds. During each round, a round-specific function is performed. The round-specific function may be based on a same round function that is executed under control of a round-specific sub-key. For many encryption systems, the round function can be specified using mapping tables or look-up tables. Even if no explicit tables were used, nevertheless frequently tables are used for different parts of the function for efficient execution in software of encryption/decryption functions. The computer code accesses or combines table values into the range value of the function. Instead of distributing keys, that may be user-specific, it becomes more interesting to distribute user specific algorithms instead of keys for encryption or decryption algorithms. These algorithms, most often functions (mappings), have to be obfuscated (hidden) in order to prevent redesign or prohibit the re-computation of elements that are key-like. On computers, tables accompanied with some computer code often represent these functions.

Content providers must deliver content to legitimate users across a hostile network to a community where not all users or devices can be trusted. In particular for the PC platform, the user must be assumed to have complete control of the hardware and software that provides access to the content, and an unlimited amount of time and resources to attack and bypass any content protection mechanisms. The software code that enforces the terms and conditions under which the content may be used must not be tampered with. The general approach in digital rights management for protected content distributed to PCs is to encrypt the digital content, for instance DES (Data Encryption Standard), AES (Advanced Encryption Standard), or using the method disclosed in WO9967918, and to use decryption keys.

The two main areas of vulnerability of digital rights management relying on encryption are the software plug-ins which enforce the terms and conditions under which the content may be used, and the key distribution and handling.

Typically, the plug-in enforces the terms and conditions under which the content is to be used. An attacker aiming to remove these terms and conditions may attempt to achieve this through tampering of the program code comprised in the software plug-in.

In relation to key handling, for playback a media player has to retrieve a decryption key from a license database. It then has to store this decryption key somewhere in memory for the decryption of the encrypted content. This leaves an attacker two options for an attack on the key. Firstly, reverse engineering of the license database access function could result in black box software (i.e., the attacker does not have to understand the internal workings of the software function), allowing the attacker to retrieve asset keys from all license databases. Secondly, by observation of the accesses to memory during content decryption, it is possible to retrieve the asset key. In both cases the key is considered to be compromised. In the following, a description of how in general software may be made tamper-resistant is provided.

Tamper-resistant software is so called because goal-directed tampering with the software is complicated. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the application, and consequently to change it.

"White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1", and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2", disclose methods with the intend to hide the key by a combination of encoding its tables with random bijections representing compositions rather than individual steps, and extending the cryptographic boundary by pushing it out further into the containing application.

SUMMARY OF THE INVENTION

It would be advantageous to have an improved method of protecting an integrity of a data processing system. To better address this concern, in a first aspect of the invention a method is presented that comprises:

determining a data string to be protected, an integrity of the data string being an indication of the integrity of the data processing system;

computing a set of parameters at least partly representing a predetermined data processing function, using a redundancy in the set of parameters to incorporate the data string into a bit representation of the set of parameters; and enabling the system to process data according to the set of parameters, wherein a change of the data string in the bit representation of the set of parameters causes the system to lose its capability to process the data according to the data processing function.

Because the data string is incorporated in a bit representation of the computed set of parameters, making changes to the data string implies making changes to the set of parameters. As the set of parameters represents a data processing function, changing the set of parameters implies changing the data processing function. Therefore, a change to the data string results in a change in the data processing function defined by the set of parameters. The integrity of the data processing system is protected as it is relatively difficult to change the data string without changing the data processing function. Consequently it is avoided that the data processing takes place according to the predetermined algorithm if the data string has changed.

The data string can be part of the system or can be provided to the system separately. The data string and the predetermined data processing function preferably are independent from each other. The data processing function is for example defined by a cryptographic algorithm with a particular key. The identification of the data processing function can be by means of a pseudo-random procedure. The data processing function may be a fully defined cryptographic algorithm, for example a decryption algorithm with a particular key. However, the data processing function may by any data processing function, for example an image enhancement function.

In an embodiment, the set of parameters represents at least part of a cryptographic algorithm including a cryptographic key. The set of parameters defines the cryptographic key. Examples of cryptographic algorithms include decryption algorithms, encryption algorithms, and watermarking algorithms.

In an embodiment, the set of parameters represents a network of look-up tables. Such a set of parameters inherently includes a lot of redundancy, and it is possible to add redundancy by adding look-up tables to the network. Consequently it is relatively easy to compute a set of parameters, wherein a bit representation of the computed set of parameters includes the data string to be protected.

In an embodiment, the network of look-up tables comprises a plurality of look-up tables of a white-box implementation of a data processing algorithm. White-box implementations of a data processing algorithm have the property that they hide some of the internal workings of the data processing algorithm, which makes it more difficult to repair any defects caused by a change to the string to be protected.

In an embodiment, the data processing algorithm is a cryptographic algorithm. Cryptographic algorithms are a common object of attackers who whish to make changes to software and hardware systems in order to process (usually decrypt) data to which the attacker is not entitled. These algorithms can be protected by making it more difficult to tamper with the string.

An embodiment comprises
providing the system with the set of parameters except the data string to be protected; and
enabling the system to obtain the data string from an execution environment of the system.

This embodiment allows to protect the execution environment of the system, because the data processing will only be successful if the data string in the execution environment has not been tampered with.

An embodiment comprises
providing the system with the set of parameters except the data string to be protected; and
enabling the system to obtain the data string by means of a challenge/response protocol.

This embodiment allows to protect the system via a challenge/response protocol. In such a protocol, the system poses a challenge to another unit, and receives a response in return. This embodiment allows the response to be a predetermined string.

An embodiment comprises enabling the system to derive the data string from computer executable code that is part of the system. This is a way to make tampering with the computer executable code more difficult: a change to the code implies a change to the set of parameters, and vice versa.

In an embodiment, the computer executable code comprises at least part of a set of instructions for establishing an authenticity of the system or for enforcing permissions control. These parts of a set of instructions are especially important in digital rights management.

For example, the data string to be protected comprises a representation of at least one of:
a hardware identifier,
part of content to be processed,
computer executable code,
processor instructions,
a password, or
a response that the system is arranged to obtain by means of a challenge/response protocol.

An embodiment comprises
computing a network of look-up tables representing a cryptographic key;
selecting at least one word of the data string to be protected for inclusion in at least one of the look-up tables;
including the word in the at least one of the look-up tables by applying a transformation to elements of the look-up table;
compensating for the transformation by applying a compensating transformation inverting an effect of the transformation; and
using the transformed network of look-up tables as the parameters.

In this case, the digital processing may comprise encrypting or decrypting according to the cryptographic key. The digital processing may also comprise authentication based on the cryptographic key. Both can be realized by performing a series of table lookups in a network of look-up tables that is set up to implement a part of a cryptographic algorithm. The instructions may be designed to perform the table-lookups according to the tables provided in the parameters. The compensating transformation inverting an effect of the transformation may be applied to elements of at least one of the other look-up tables connected to the at least one of the look-up tables via the network. The compensating transformation may also be applied to the digital data by the content provider, or by the program.

The network of look-up tables may for example represent a round of a cryptographic algorithm such as AES or DES. Preferably, the network of look-up tables is obfuscated by applying an encoding to the input and output of each table. These encodings have an influence on the contents of the look-up table; changing the encoding changes the contents of the table in a predictable way. However, it may be difficult for an attacker to unravel the encodings as he only has knowledge of the final look-up table indicative of a mapping whose inputs and outputs have been encoded in a relatively complex way. The transformation applied to the elements of the look-up table can be realized by appropriately changing the encodings. By changing an output encoding, particular values may be incorporated in the table. By changing an input encoding, for example the order in which values appear in the table may be changed. Hereinafter, input encoding is also referred to as input decoding as it may decode the encoding of data caused by an output encoding of a preceding look-up table.

An embodiment comprises arranging an output encoding (e.g. $f$) of a first look-up table (e.g. $f(t_1(x))$) in the network of look-up tables and an input decoding (e.g. $f^{-1}$) of a second look-up table (e.g. $t_2(f^{-1}(x))$) in the network of look-up tables, the input decoding inverting an effect of the output encoding (e.g. $t_2(f^{-1}(f(t_1(x))))=t_2(t_1(x))$), such that the selected word is included in at least one of: the first look-up table (e.g. $f(t_1(x))$) and the second look-up table (e.g. $t_2(f^{-1}(x))$). Here, the examples in parentheses only indicate an example. Other examples will be provided in the detailed description.

As the encodings of differing tables are designed to invert each other's effects, it is advantageous to consider the tables in corresponding pairs when making the changes, thus making sure that the output of the network of look-up tables remains the same.

An embodiment, in which the selected word is included in the first look-up table (e.g. $f(t_1(h^{-1}(x)))$), comprises arranging an output encoding (e.g. h) of a third look-up table (e.g. $h(t_3(x))$) in the network of look-up tables and an input decoding (e.g. $h^{-1}$) of the first look-up table (e.g. $f(t_1(h^{-1}(x)))$), the input decoding of the first look-up table inverting an effect of the output encoding of the third look-up table (e.g. $f(t_1(h^{-1}(h(t_3(x)))))=f(t_1(t_3(x)))$), for positioning the selected word in the first look-up table.

A look-up table can be manipulated with most freedom by changing both the input and output encodings. Considering at least three look-up tables when changing allows to change the input and output encodings of at least one table. Such changes may be compensated for by changing encodings of at least two other tables.

An embodiment comprises enabling the system to:

apply a first set of look-up tables of the network to a string of bits of the digital data to obtain a first set of intermediate results;

apply a second set of look-up tables of the network to the string of bits of the digital data to obtain a second set of intermediate results, a bit representation of the second set of look-up tables including the data string to be protected;

combine the first and second intermediate results for obtaining a third intermediate result; and compute processed digital data based on the third intermediate result.

For example, the step of combining may comprise applying some more look-up tables or performing an XOR operation.

An embodiment comprises a first system for protecting an integrity of a second system, the first system comprising a string determiner for determining a data string to be protected, an integrity of the data string being an indication of the integrity of the second system;

a parameterizer for computing a set of parameters at least partly representing a predetermined data processing function, using a redundancy in the set of parameters to incorporate the data string into a bit representation of the set of parameters; and a means for enabling the second system to process data according to the set of parameters, wherein a change of the data string in the bit representation of the set of parameters causes the system to lose its capability to process the data according to the data processing function.

An embodiment comprises a computer program product comprising instructions for causing a processor to perform the method set forth.

An embodiment comprises a data processing system comprising a memory for storing a data string to be protected, an integrity of the data string being an indication of the integrity of the data processing system;

a memory for storing a set of parameters at least partly representing a predetermined data processing function, the data string being incorporated into a bit representation of the set of parameters using a redundancy in the set of parameters; and a processing module for processing data according to the set of parameters, wherein a change of the data string in the bit representation of the set of parameters causes the system to lose its capability to process the data according to the data processing function.

An embodiment comprises a computer program product comprising instructions for causing a processor to process data according to a set of parameters at least partly representing a data processing function, an integrity of a data string to be protected being an indication of an integrity of the computer program product, the data string being incorporated into a bit representation of the set of parameters using a redundancy in the set of parameters, wherein a change of the data string in the bit representation of the set of parameters causes the system to lose its capability to process the data according to the data processing function.

BRIEF DESCRIPTION OF THE DRAWINGS

These and other aspects of the invention will be elucidated hereinafter by reference to the drawings, wherein.

DETAILED DESCRIPTION OF EMBODIMENTS

The approach of adding a veil of randomness and complexity in the control and the data path of the software application does not prevent the software from being subject to tampering, but only makes it more difficult to determine what changes would need to be made in order to achieve the tamperer's aim. General principles behind tamper-resistance can be outlined as follows. A program P can be represented as a composite of access control and/or permissions X and with functionality Y. An attacker may wish to tamper with the program such that the access control or permissions are removed without affecting the functionality. The tampered program could then be run without access controls or permissions at all, or at least run such that these controls are ignored. The invention will be explained mainly for the case that Y comprises a decryption functionality. However, it will be appreciated that the invention may be applied to any functionality Y including for example either encryption or decryption or a combination of both.

Ideally, for a tamper-proof program, tampering with X should immediately result in the loss of Y, no matter how small the tampering is. In other words, X and Y should be inseparable, or at least only separable with great difficulty. One way of implementing inseparability would be to create a relationship between X and Y such that any intended alteration to X results in an unintended alteration to Y, which would remove the functionality from Y. In order to reinstate the functionality of Y, a further alteration to Y would be needed. As the functionality and control elements of the program have been made inseparable, an attack becomes much more difficult. If such an inseparability is created over the code of a program, the program may be made tamper-resistant without the need for the program code to necessarily be veiled. Tamper-resistant software is software in which it is complicated to perform goal-directed tampering.

AES is a block cipher with a block size of 128 bits or 16 bytes. The plaintext is divided in blocks of 16 bytes which form the initial state of the encoding algorithm, and the final state of the encoding algorithm is the ciphertext. To conceptually explain AES, the bytes of the state are organized as a matrix of 4×4 bytes. AES consists of a number of rounds. Each round is composed of similar processing steps operating on bytes, rows, or columns of the state matrix, each round using a different round key in these processing steps.

Figure 1:
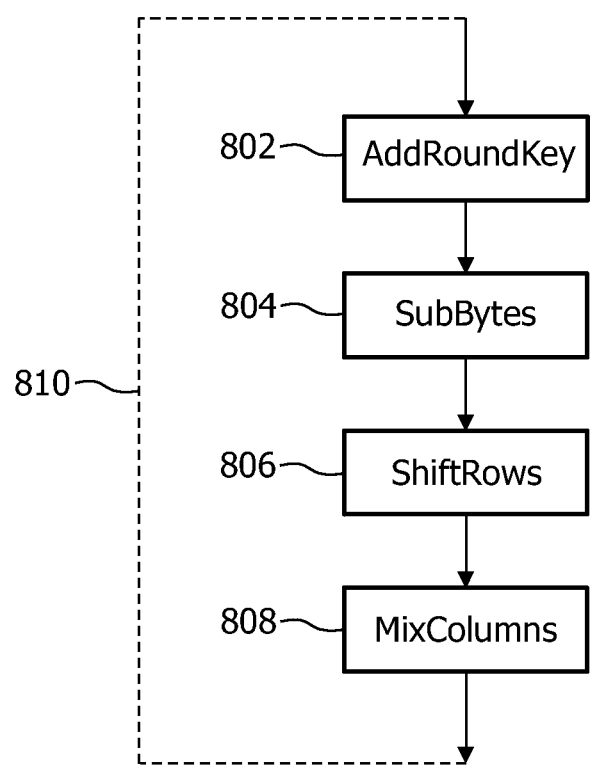
FIG. 1 is a diagram illustrating operations in a round of AES.

FIG. 1 illustrates some main processing steps of a round of AES. The processing steps include:

AddRoundKey 802—each byte of the state is XOR'ed with a byte of the round key.

SubBytes 804—A byte-to-byte permutation using a lookup table.

ShiftRows 806—Each row of the state is rotated a fixed number of bytes.

MixColumns 808—Each column is processed using a modulo multiplication in $GF(2^8)$.

The steps SubBytes 804, ShiftRows 806, and MixColumns 808 are independent of the particular key used. The key is applied in the step AddRoundKey 802. Except for the step ShiftRows 806, the processing steps can be performed on each column of the 4×4 state matrix without knowledge of the other columns. Therefore, they can be regarded as 32-bit operations as each column consists of 4 8-bit values. Dashed line 810 indicates that the process is repeated until the required number of rounds has been performed.

Each of these steps or a combination of steps may be represented by a lookup table or by a network of lookup tables (S-boxes). It is also possible to replace a full round of AES by a network of lookup tables. For example, the AddRoundKey step can be implemented by simply XOR'ing with the round key, while the SubBytes, ShiftRows, and MixColumns steps are implemented using table lookups. However, this means that the key is still visible to the attacker in the white-box attack context. The AddRoundKey step can also be embedded in the lookup tables, which makes it less obvious to find out the key.

Figure 2:
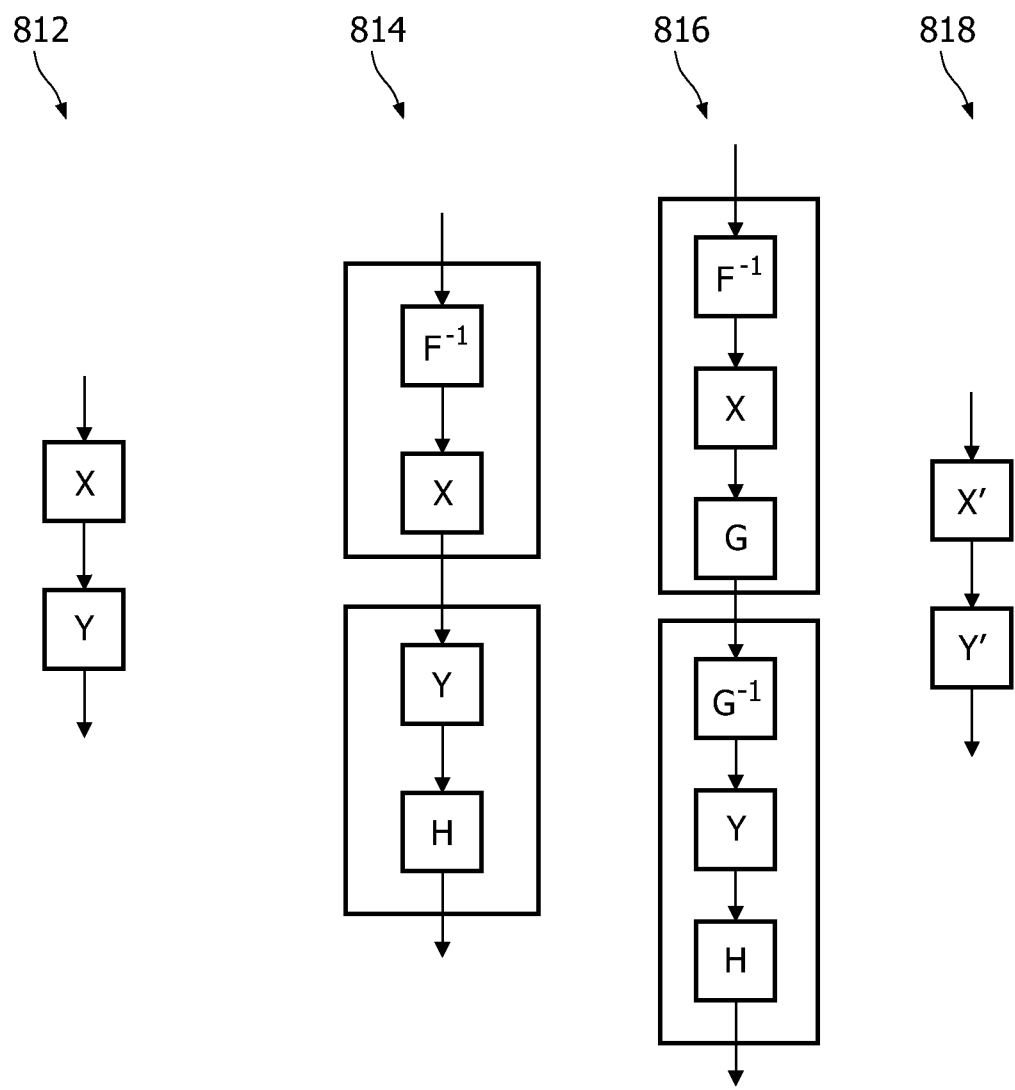
FIG. 2 is a diagram illustrating an example of obfuscating tables.

FIG. 2 illustrates a way to make it even more difficult to extract the key. Let X and Y be two functions. Consider an operation $Y \circ X = Y(X(c))$, illustrated as diagram 812, where c is an input value, for example a 4-byte state column. However, the approach applies to any type of input value c. Mappings X and Y can be implemented as look-up tables which can be stored in memory, however, when they are stored in memory the values can be read by an attacker. Diagram 14 illustrates how the contents of the look-up tables can be obfuscated by using an input encoding F and an output encoding H. Look-up tables corresponding to $X \circ F^{-1}$ and $H \circ Y$ are stored as illustrated instead of X and Y, making it more difficult to extract X and Y. Diagram 816 shows how to add an additional, for example random, bijective function G, such that the intermediate result of the two tables is also encoded. In this case, two tables are stored in memory: $X' = G \circ X \circ F^{-1}$ and $Y' = H \circ Y \circ G^{-1}$. This is illustrated once more in diagram 818:

$$Y' \circ X' = (H \circ Y \circ G^{-1}) \circ (G \circ X \circ F^{-1}) = H \circ (Y \circ X) \circ F^{-1},$$

where ∘ denotes function composition as usual (i.e., for any two functions f(x) and g(x), f∘g(x)=f(g(x)) by definition), X and Y are functions suitable for implementation by means of look-up tables. Likewise a network consisting of more than two functions can be encoded. The actual tables encoding X and Y are obfuscated by combining $H \circ Y \circ G^{-1}$ in a single look-up table and combining $G \circ X \circ F^{-1}$ in a single look-up table. As long as F, G, and/or H remain unknown, the attacker cannot extract information about X and/or Y from the look-up tables, and hence the attacker cannot extract the key that is the basis for X and/or Y. Other cryptographic algorithms, including DES and Rijndael (of which AES is a particular instantiation), may also be encoded as a (cascade or network of) look-up tables that may be obfuscated in a way similar to the above. The invention is not limited to the exemplary cryptographic algorithms mentioned.

Chow 1 discloses a method with the intent to hide the key by encoding its tables with random bijections representing compositions rather than individual steps. Preventing secret-key extraction has the advantage that an attacker is prevented from extracting keying material which would allow software protection goals to be bypassed on other machines, or from publishing keying material effectively creating 'global cracks' which defeat security measures across large user-bases of installed software. It provides an increased degree of protection given the constraints of a software-only solution and the hostile-host reality. In the approach of Chow 1, the key is hidden by (1) using tables for compositions rather than individual steps; (2) encoding these tables with random bijections; and (3) extending the cryptographic boundary beyond the crypto algorithm itself further out into the containing application, forcing attackers (reverse engineers) to understand significantly larger code segments to achieve their goals. Chow 1 discusses a fixed key approach: the key(s) are embedded in the implementation by partial evaluation with respect to the key(s), so that key input is unnecessary. Partial evaluation means that expressions involving the key are evaluated as much as reasonably possible, and the result is put in the code rather than the full expressions. The attacker could extract a key-specific implementation and use it instead of the key, however cryptography is typically a component of a larger containing system that can provide the input to the cryptographic component in a manipulated or encoded form, for which the component is designed, but which an adversary will find difficult to remove. Referring to the step of encoding tables, since encodings are arbitrary, results are meaningful only if the output encoding of one step matches the input encoding of the next. For example, if step X is followed by step Y (resulting in computation of Y∘X), the computation could be encoded as $$Y'\circ X'=(H\circ Y\circ G^{-1})\circ(G\circ X\circ F^{-1})=H\circ(Y\circ X)\circ F^{-1}.$$

This way, Y∘X is properly computed albeit that the input needs to be encoded with F and the output needs to be decoded with $H^{-1}$. The steps are separately represented as tables corresponding to Y' and X', so that F, G, and H are hidden as well as X and Y.

Apart from such confusion steps, Chow 1 uses diffusion steps by means of linear transformations to further disguise the underlying operations. The term mixing bijection is used to describe a linear bijection, used in the above sense. The implementation of Chow 1 takes input in a manipulated form, and produces output in a differently manipulated form, thereby making the white-box attack context (WBAC) resistant AES difficult to separate from its containing application.

Chow 2 discusses a cryptographic implementation of DES designed to withstand the white-box attack context with the objective to prevent the extraction of secret keys from the program. The techniques discussed in this paper about obfuscating look-up table networks applies for a large part also to other cryptographic algorithm including AES and others. While an attacker controlling the execution environment can clearly make use of the software itself (e.g. for decryption) without explicitly extracting the key, forcing an attacker to use the installed instance at hand is often of value to digital rights management (DRM) systems providers. In general, the approach in Chow 2 is to work towards an implementation consisting entirely of substitution boxes, none of which implement affine transformations. A number of techniques are described in Chow 2 that are needed to support the general approach. Some of these techniques are I/O-blocked encoding, combined function encoding, by-pass encoding, split-path encoding, and output splitting.

Partial evaluation means that expressions based on values (partially) known at the time of implementation are pre-evaluated. In a simplified example, when the key is '5', and the original implementation contains the expression '2*key', then rather than incorporating '2*5' in the implementation, the pre-evaluated expression '10' is put in the implementation. This way, the key '5' is not directly present in the code. In the case of DES with a fixed key, this involves replacing standard S-boxes (computed from the key at run-time) with key-specific pre-evaluated S-boxes (computed from the key at or before compilation time). A mixing bijection according to Chow 2 is a bijective affine transformation designed such that each output bit depends on a large number of input bits. I/O-blocked encoding is an encoding method for handling large numbers of input and output bits. In this case, the encoding/decoding can be formed as a concatenation of encodings, where each encoding deals with a subset of the input/output bits. Combined function encoding means that if two or more operations can be processed in parallel, a single encoding function is applied to the concatenation of the inputs (respectively outputs) of the parallel operations. It is more or less the opposite of I/O-blocked encoding. By-pass encoding means that the encoding transformation adds a number of superfluous bits of entropy to the input and/or output of the transform to be obfuscated, and redesign the transform to be obfuscated to "by-pass" the superfluous bits such that they do not effect the final output of the procedure. Split-path encoding means that a function is modified to provide additional output bits for obfuscating the essential information bits. Output splitting means that the output of a function is distributed over several partial functions, where the output of all partial functions must be combined in a non-obvious way in order to obtain the original output of the function.

Chow 2 proposes building encoded networks to construct S-boxes with wide input of, say, 32 bits or even 96 bits. Such a wide-input S-box representing an affine transformation is divided into a network of S-boxes each having a more narrow input and output; each of the S-boxes is encoded by incorporating an encoding function in the S-box. The inverse of the encoding function is incorporated in the S-box processing the output of the S-box.

A White-box AES implementation can be sketched as follows. The input to the AES encryption and decryption algorithm is a single 128-bit block. This block is represented by a 4×4 matrix consisting of 16 bytes. AES usually consists of 10 rounds for AES-128. Each round updates a set of sixteen bytes which form the state of AES, thus each AES round processes 128 bits. AES-128 uses a key of 128 bits. This key serves as input for an algorithm which converts the key into different round keys of 128 bits. A basic round consists of four parts:

SubBytes
ShiftRows
MixColumns
AddRoundKey.

This order of operations applies to AES encryption. Although the standard order of operations in AES decryption is different, it is possible to rewrite the AES decryption algorithm to have the same order of operations as for AES encryption.

Before the first round, an extra AddRoundKey operation occurs, and from round ten the MixColumns operation is omitted. The only part that uses the key is AddRoundKey, the other three parts do nothing with the key. In the implementation the boundaries of the rounds are changed to integrate the AddRoundKey step and the SubBytes step of the next round into one step. A round begins with AddRoundKey and SubBytes followed by ShiftRows and finally MixColumns.

First, the key is hidden by composing the SubBytes step and the AddRoundKey together into one step. This makes the key no longer visible on its own. Because the key is known in advance, the operations involving the key can be pre-evaluated. This means that the standard S-Boxes which are used in the step SubBytes can be replaced with key-specific S-Boxes. To generate key-specific instances of AES-128, the key is integrated into the SubBytes transformations by creating sixteen 8×8 (i.e. 8-bit input, 8-bit output) lookup tables $T_{i,j}^r$ which are defined as follows:

$$T_{i,j}^r(x) = S(x \oplus k_{i,j}^{r-1}), i=0,\ldots,3; j=0,\ldots,3; r=1,\ldots,9,$$

where S is the AES S-box (an invertible 8-bit mapping), and $k_{i,j}^r$ is the AES sub-key byte at position i, j of the 4×4 matrix which represents the round key for round r. These T-boxes compose the SubBytes step with the previous round's AddRoundKey step. The round 10 T-boxes absorb the post-whitening key as follows:

$$T_{i,j}^{10}(x) = S(x \oplus k_{i,j}^9) \oplus k_{sr(i,j)}^{10}, i=0,\ldots,3; j=0,\ldots,3,$$

where sr(i, j) denotes the new location of cell i, j after the ShiftRows step. The total number of T-boxes is 10×16=160. However, the key can easily be recovered from T-boxes because $S^{-1}$ is publicly known. This makes additional encodings necessary. Linear transformations are used for diffusing the inputs to the T-boxes. These linear transformations are called mixing bijections and can be represented as 8×8 matrices over GF(2). The mixing bijections are inverted by an earlier computation to undo their effect.

Figure 3:
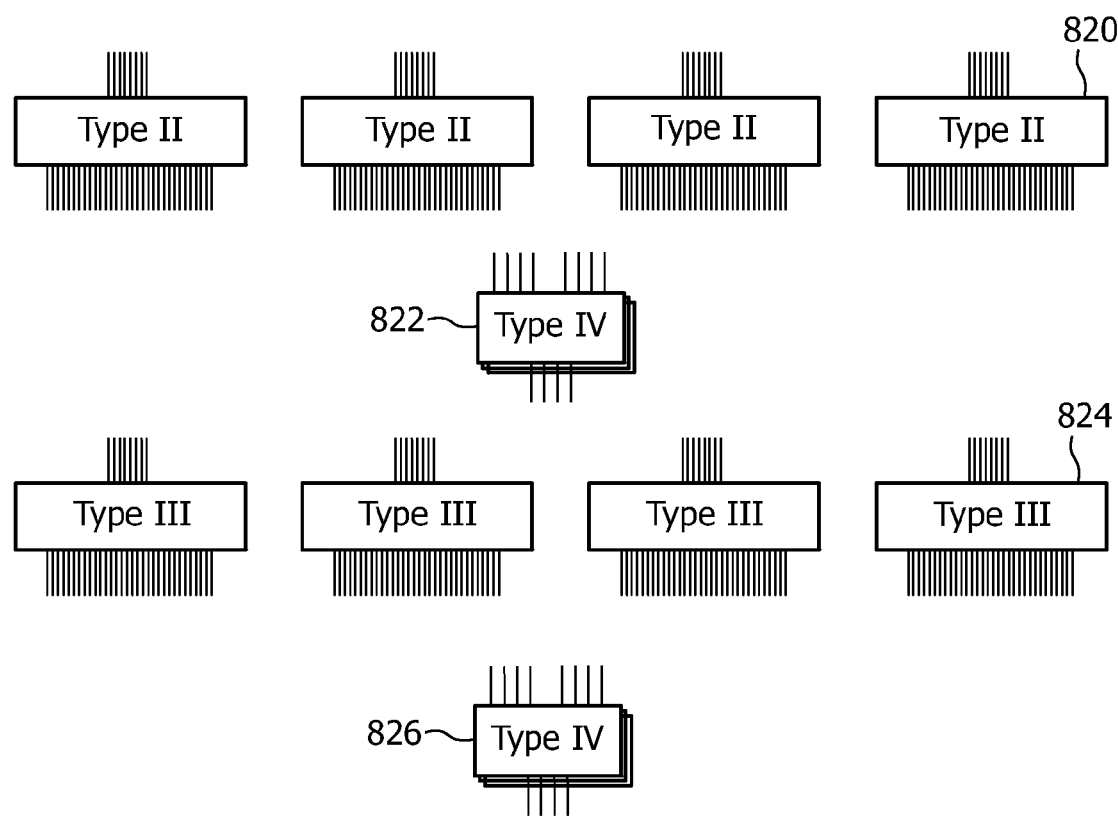
FIG. 3 is a diagram illustrating a round for a column in a white-box AES implementation.

FIG. 3 illustrates the tables involved in a round of white-box AES for one 32-bit column of the state (after applying ShiftRows). The names of the different types of tables are introduced here. They are discussed in more detail hereinafter. Before the rounds, each byte of the 128-bit state is applied to a respective type Ia table. This results in respective 128-bit values which are XOR'ed using a network of type IV tables to provide a 128-bit output that is divided into four 32-bit values. The processing steps of each 32-bit value are outlined here. The four bytes of the 32-bit value are input to four respective type II tables 20. Each of the four type II tables 20 result in a 32-bit output. These outputs are bitwise XOR'ed using type IV tables 22. Each type IV table 22 performs a 4-bit bitwise XOR. By properly connecting inputs and outputs of type IV tables, the bitwise XOR of the four 32-bit outputs can be realized as will be understood by the skilled artisan. The result of this step is a 32-bit value. Each of the four bytes of this value is applied to a respective type III table 24. Each type III table provides a 32-bit output. These outputs are again bitwise XOR'ed using a network of type IV tables 26 similar to the network of type IV tables 22. The output is a 32-bit value indicative of a column of the state. This is repeated for each round.

After the rounds have been performed for each of the four 32-bit values, the outputs are combined into a 128-bit value. Each byte of the 128-bit value is applied to a type Ib table; the results are XOR'ed using a network of type IV tables.

Figure 4:
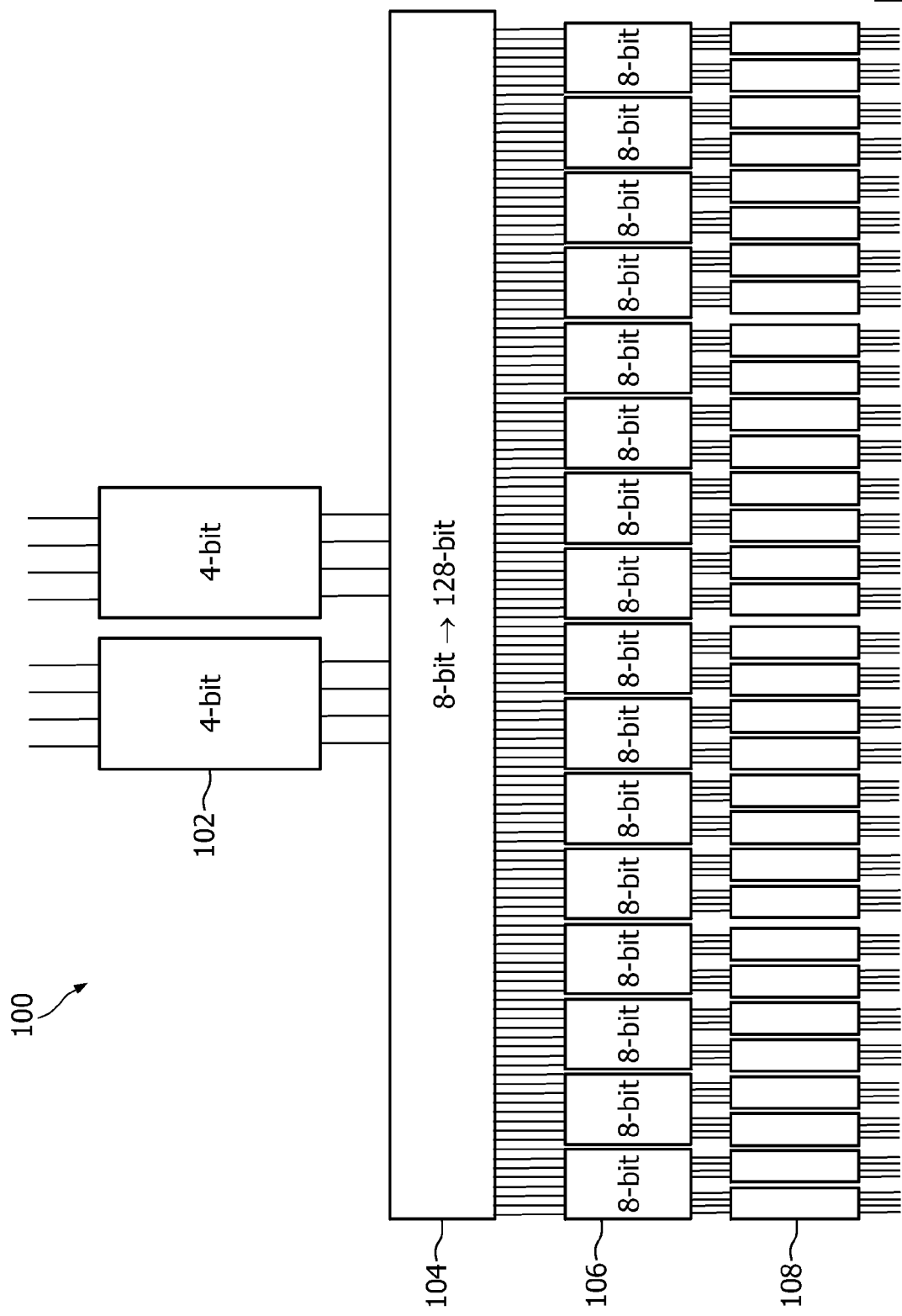
FIG. 4 is a diagram illustrating mappings incorporated in a type Ia table.
Figure 5:
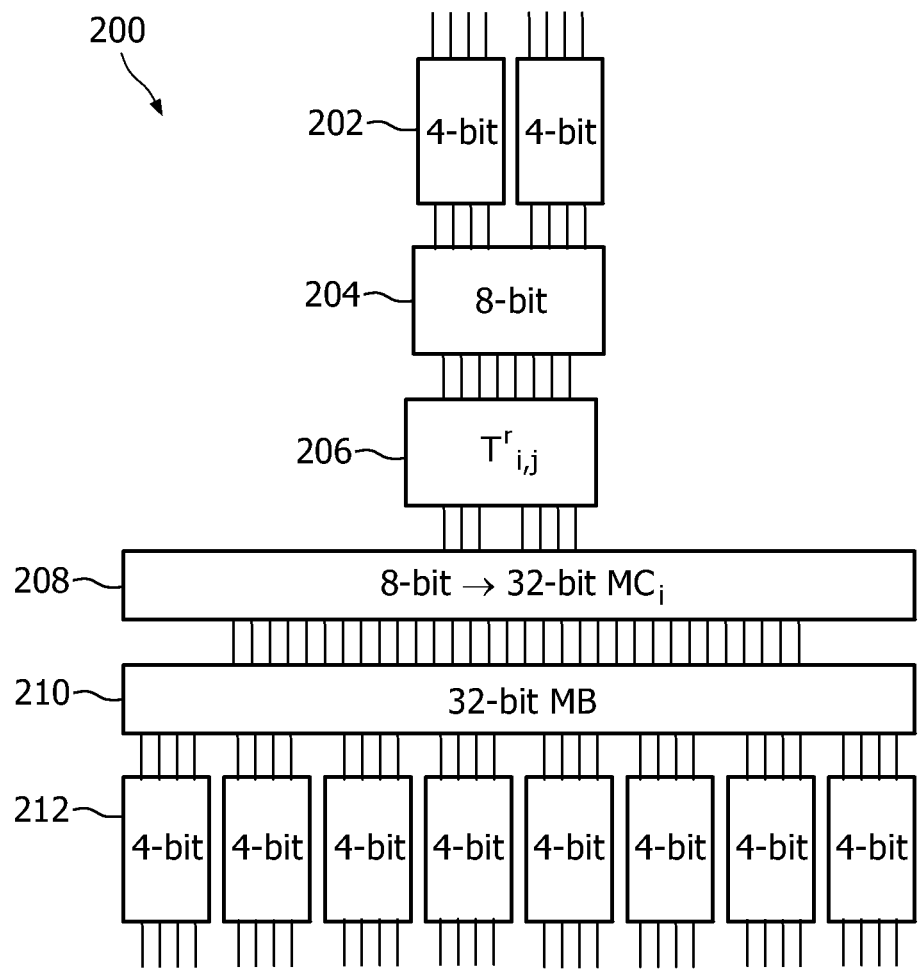
FIG. 5 is a diagram illustrating mappings incorporated in a type II table.
Figure 6:
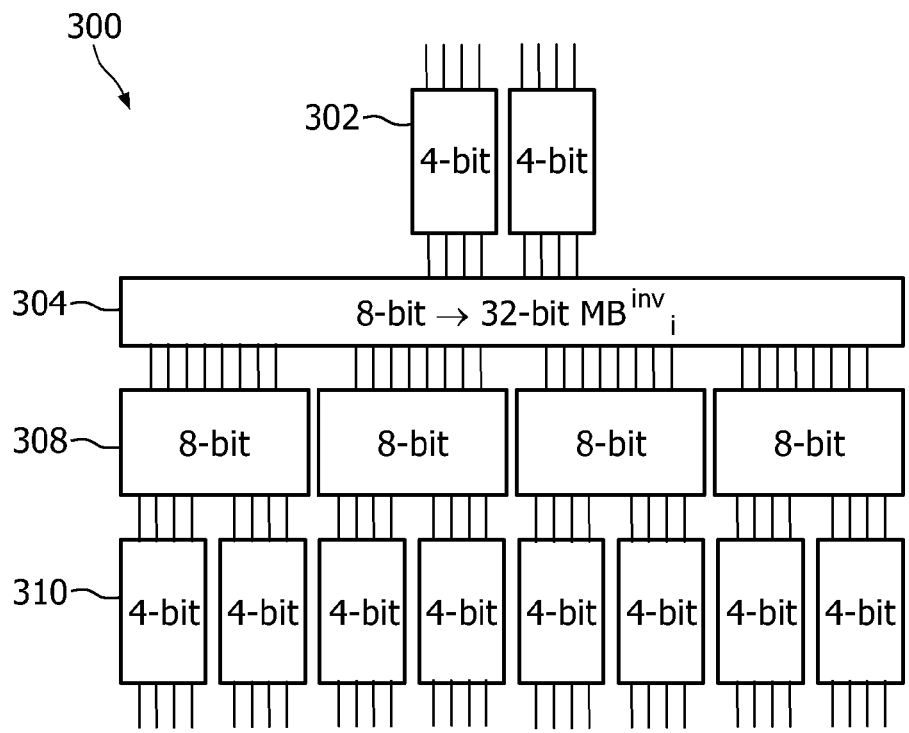
FIG. 6 is a diagram illustrating mappings incorporated in a type III table.
Figure 7:
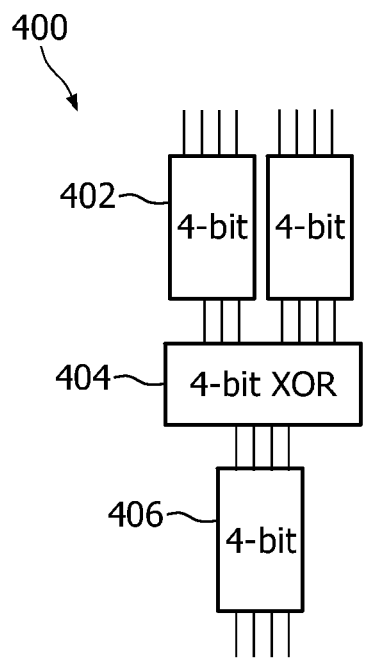
FIG. 7 is a diagram illustrating mappings incorporated in a type IV table.
Figure 8:
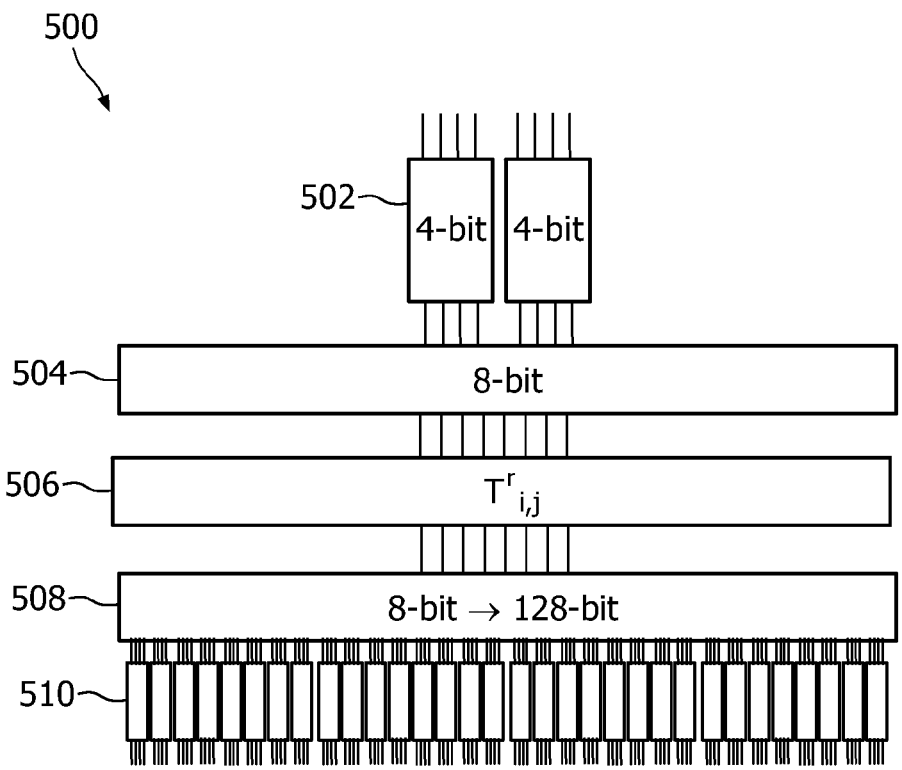
FIG. 8 is a diagram illustrating mappings incorporated in a type Ib table.

FIG. 4 illustrates a type Ia table 100. FIG. 5 illustrates a type II table 200. FIG. 6 illustrates a type III table 300. FIG. 7 illustrates a type IV table 400. FIG. 8 illustrates a type Ib table 500.

The mixing bijections are used as follows. An AES state is represented by a 4×4 matrix consisting of bytes. The MixColumns step operates on a column (four 8-bit cells) at a time. Consider a 32×32 matrix MC. If this is represented by a table, this table would cost $2^{32} \times 32 = 137438953472$ bits=16 GB. In order to avoid such large tables the matrix is blocked into four sections.

MC is blocked into four 32×8 sections, $MC_0$, $MC_1$, $MC_2$, $MC_3$ (block 208). Multiplication of a 32-bit vector $x = (x_0,\ldots,x_{31})$ by MC is done by dividing the bits of x into four bytes and multiplying each of the sections of MC with one of the bytes, yielding four 32-bit vectors $(z_0,\ldots,z_3)$. This is followed by three 32-bits XORs giving the final 32-bit result z. The four tables together only cost $4 \times 2^8 \times 32 = 32768$ bits=4 KB.

The three XORs will be divided into 24 4-bit XORs, each represented by a possibly encoded look-up table, with appropriate concatenation (e.g. ((z[0, 0], z[0, 1], z[0, 2], z[0, 3])+(z[1, 0], z[1, 1], z[1, 2], z[1, 3]))‖((z[0, 4], z[0, 5], z[0, 6], z[0, 7])+(z[1, 4], z[1, 5], z[1, 6], z[1, 7]))‖ . . . ), where ‖ denotes concatenation and + denotes XOR. By using these strips and subdivided XORs, each step is represented by a small lookup table. In particular, for i=0, . . . , 3 the $z_i$ are computed using 8×32 tables, while the 4-bit XORs become 24 8×4 tables. FIG. 7 illustrates how input decodings 402 and output encodings 406 can be put around the XORs 404. These encodings are usually randomly chosen non-linear 4×4 bijections. The XOR tables are called type IV tables 400. The type IV tables take as input 4 bits from each of two previous computations. The output encodings 212 of those computations are matched with the input decodings 402 for the type IV tables to undo each other. The choice for 4×4 non-linear bijections depended on the size of the tables. In this situation a type IV table is only $2^8 \times 4$ bits=128 bytes. 24 tables are needed which cost together 3 KB. If the XORs were not divided, three XOR tables would be needed which computed 32-bit XORs. One such a table would cost 224 KB. The T-boxes 206 and the 8×32 tables 208 could be represented as separate lookup tables. Instead, they can be composed creating new 8×32 tables 200 computing the SubBytes and AddRoundKey transformations as well as part of MixColumns. This saves both space (to store the T-boxes) and time (to perform the table lookups).

Before splitting MC into $MC_i$ as above, MC will be left-multiplied by a 32×32 mixing bijection MB, illustratively indicated in FIG. 5 at reference numeral 210, chosen as a non-singular matrix with 4×4 sub-matrices of full rank. The use of mixing bijections increases the number of possible constructions for a particular table.

FIG. 5 illustrates an 8×32 type II table 200 including 4×4 input decodings 202 and 4×4 output encodings 212. These output encodings and input decodings are non-linear 4×4 bijections which must match the input decodings and output encodings of the type IV tables 400. The type II tables 200 are followed by type IV tables 400. In order to invert MB, an extra set of tables is used for calculating $MB^{-1}$. Let $(x'_0,\ldots,x'_{31})$ be the input to MixColumns, and let $(z_0,\ldots,z_{31})$ be the output after MixColumns. Let $(z'_0,\ldots,z'_{31})^T$ be the result after multiplication with MB. $(z'_0,\ldots,z'_{31})^T$ serves as input to the type III tables 300. Note that the input decodings and the output encodings need not be considered here because the output encoding of a table is undone by the input decoding of a next table. In the type III tables 300, $MB^{-1}$ is applied 304 and the inverses 308 of the four input mixing bijections 204 of the next round's four type II tables 200.

FIG. 6 illustrates an 8×32 type III table 300 including 4×4 non-linear input decodings and 4×4 non-linear output encodings. These tables are followed by corresponding type IV tables 400.

One round of data operations involves an operation on a 128-bit state matrix. The data operations performed on each of four strips of 32 bits of the 128-bit state matrix is as follows. The 32-bit strip is divided into four 8-bit bytes. Each of the four bytes is fed into a distinct type II table 200, resulting in four 32-bit output values. These values have to be XOR'ed using obfuscated type IV tables 400. To that end, each 32-bit output value is divided into eight 4-bit nibbles, and appropriate pairs of nibbles are input to respective type IV tables, such that the XOR of the four 32-bit output values is obtained in encoded form.

This 32-bit resulting encoded XOR'ed result is again divided into bytes, and each byte is input to a distinct type III table 300. The input decoding of each nibble of the type III tables corresponds to the output encoding of the last applied type IV tables. The type III tables again result in four 32-bit output values that are again XOR'ed using obfuscated type IV tables 400.

In summary, the rounds are implemented by lookup tables. The lookup tables of a single round are networked as follows. The data is fed into Type II tables. The output of these tables is fed to a network of Type IV tables representing encoded XORs. The output of this network is fed to Type III tables canceling the mixing bijection encoding that is inserted by the Type II tables. The encoded output of the round is finally derived by feeding the output of the Type III tables into, again, a network of Type IV tables representing encoded XORs.

Furthermore, the white-box implementation contains Type I tables at the beginning (type Ia table 100) and the end (type Ib table 500) for respectively canceling out and inserting external encodings. The type Ia table 100 can be used to apply a concatenation of mappings as illustrated in FIG. 4 by applying a single table look-up. In the concatenation, a 4-bit nibble input decoding 102 appears first. Then, an 8-bit to 128-bit bijection 104 appears; this bijection effectuates an encoding of the input and output of the network; this mapping can be undone elsewhere in the program. The result of bijection 104 is split in 16 eight-bit pieces to which respective 8-bit bijections 106 are applied. Finally, the output nibble encoding 108 is applied. As mentioned, the cascade of mappings 102, 104, 106, and 108 is pre-evaluated and the final result is tabulated in a look-up table. This results in a table with at most 256 entries of 128 bits each. The concatenation of mappings incorporated in a type Ib table 500 is schematically displayed in FIG. 8. The first mapping is the input nibble decoding 502, which is followed by an 8-bit bijection 504, a T-box $T_{i,j}{}^r$ 506, where r corresponds to the last round, an 8-bit to 128 bit mapping for providing output encoding, and output nibble encodings 510. The 128-bit output of this kind of table is XOR'ed with the output of other type Ib tables, again making use of nibble input and output encoded type IV tables 400. The output encoding 508 is undone elsewhere in the program, i.e., outside the cryptographic part of the program. This makes it more difficult for an attacker to break the encodings of the tables by analyzing only an input and an output of the cryptographic part of the program.

In an aspect of the invention, a method for enabling tamper-resistant digital data distribution is provided. The data needs to be processed by computer code comprising instructions available to a receiver of the digital data. Purpose of the processing may be a rendering of audio/video signals represented by the data. The processing may comprise encrypting, decrypting, compression, decompression, or other processing. The method comprises composing a plurality of instructions comprising an implementation of a processing algorithm for processing the digital data. The plurality of instructions form a computer program, for example a plug-in or media player needed on a user terminal for successful playback of the distributed content. The processing algorithm is based on parameters. In case of decryption, the parameters may represent a cryptographic key. The distributed data may be (partly) encrypted using a corresponding encryption key.

A part of the parameters is identified that is equivalent to a part of the processor instructions. More particularly, a part of a bit representation of the parameters is equal to a part of a bit representation of the instructions. A remaining part of the parameters may be different from any processor instructions.

The processor instructions are arranged such, that during execution the equal part of the parameters is read (for example for use in the decryption process) by referencing a memory location of the part of the bit representation of the processor instructions. The equal part of the parameters is not stored separately in memory, as the required bit representation is already present at the memory addresses holding the coinciding processor instructions. Effectively a same memory address is used in two ways: as a storage location of a parameter to a decryption algorithm, and at the same time as a storage location for a processor instruction to be executed. Typically the instruction reading the memory location as a parameter is itself stored at a different memory location, and accesses the memory location holding the parameter by reference. The instructions form program code. The instructions are compliant with the execution environment where the program code is executed. For example they are processor instructions or pseudo code instructions such as virtual machine instructions (e.g. java bytecode).

In another aspect of the invention, the parameters are chosen such that they contain a relatively large equal part. A single memory address may hold data that can be used in two seemingly unrelated ways: as a processor instruction and as a parameter value. This has the effect that if an attacker changes the processor instruction, the parameters may become invalid, and vice versa, if an attacker changes the parameters, the processor instruction becomes invalid. It may thus become more difficult for an attacker to perform goal directed tampering.

It is possible to make a distinction between, firstly, the computer executable instructions for processing the digital data based on the parameters, and, secondly, the computer executable instructions of which a bit representation is equal to a part of a bit representation of the parameters. The second instructions are unified with parameters used by the first instructions. Of course, the first and second instructions may be the same. However, it is also possible that the second instructions are part of another module of the software program, or are part of a completely different program. For example, the first instructions may be part of a plug-in for decrypting video content or authenticating a bank transaction, whereas the second instructions may be part of vital operating system components such as the operating system kernel or a TCP/IP driver. Since the first instructions use a bit representation of the second instructions to obtain parameter values, the decrypting or authenticating will only be successful if the kernel or driver has not been tampered with. Hereby, the tamper resistance of the digital rights enforcement or the security of the bank transaction are improved.

Choice of the Encoding

Figure 10:
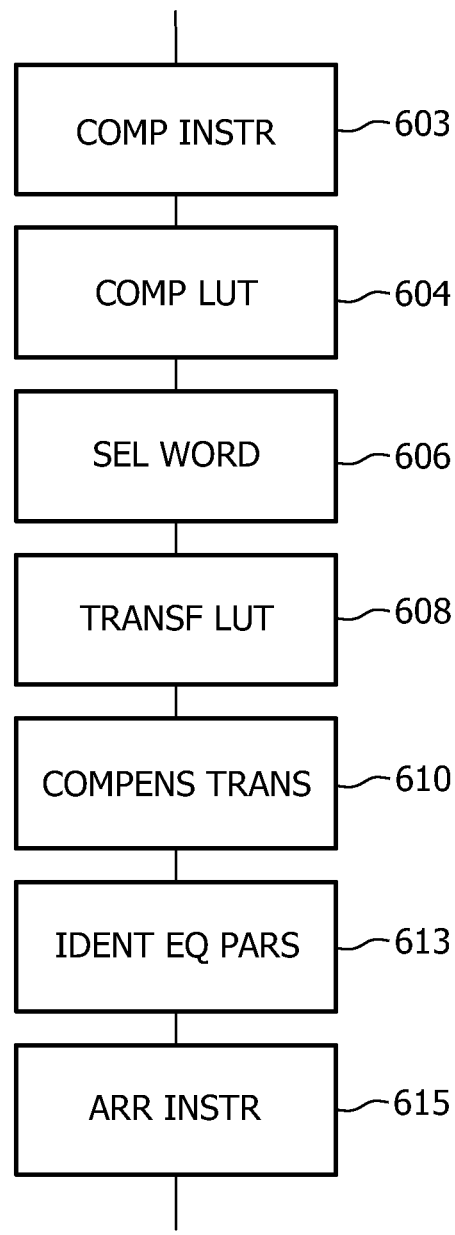
FIG. 10 is a flowchart illustrating more processing steps.

FIG. 10 illustrates another aspect of the invention. It shows the steps of composing the implementation 603, identifying the coinciding part of the parameters 613, and arranging the implementation 615. The parameters may include one or more look-up tables, for example forming a network of look-up tables. Such a network of look-up tables can be computed (step 604) for example from the cryptographic key. A word of the bit representation of the processor instructions is selected (in step 606) for inclusion in at least one of the look-up tables in the network. The inclusion of the word is realized by applying (in step 608) a transformation to elements of the look-up table. This transformation is compensated for by applying (in step 610) a compensating transformation inverting an effect of the transformation to elements of at least one of the other look-up tables. Usually the at least two transformed look-up tables are connected via the network of look-up tables. The transformed network of look-up tables are used as the parameters of the cryptographic algorithm rather than the original network of look-up tables.

In an embodiment, the look-up tables may be obfuscated using output and/or input encodings. For example a first lookup table $f(t_1(x))$ in the network of look-up tables has output encoding $f$. A second look-up table $t_2(f^{-1}(x))$ in the network of look-up tables has an input decoding $f^{-1}$. The input decoding $f$ inverts an effect of the output encoding, for example $t_2(f^{-1}(f(t_1(x))))=t_2(t_1(x))$. The decodings $f$ and $f^{-1}$ may be chosen such that a predetermined word is included in the first look-up table $f(t_1(x))$ or the second look-up table $t_2(f^{-1}(x))$. Let for example $t_1(x_0)=y_0$. To include the word w in the look-up table, $f$ can be chosen such that $f(y_0)=w$, because in that case $f(t_1(x))=f(y_0)=w$. This will put w at position $x_0$ in the look-up table. To compensate, $f^{-1}$ is chosen such that $f^{-1}(w)=y_0$.

The selected word can be re-positioned by adapting an input decoding of the look-up table. For example, consider the example outlined above with look-up table implementing $f(t_1(x))$, where $f$ is chosen such that $f(t_1(x_0))=w$. If it is desired to put w at a position $x_1$ rather than $x_0$, then this can be realized by arranging an input decoding $h^{-1}$ to obtain a look-up table implementing $f(t_1(h^{-1}(x)))$. Here, $h^{-1}$ is chosen such that $h^{-1}(x_1)=x_0$. This gives that $f(t_1(h^{-1}(x_1)))=f(t_1(x_0))=w$. This will put w at position $x_1$ in the look-up table. To compensate, h is chosen such that $h(x_0)=x_1$ and applied as output encoding in a third look-up table $h(t_3(x))$. The composition of the three look-up tables could be $$t_2(f^{-1}(f(t_1(h^{-1}(h(t_3(x))))))) = t_2 \circ f^{-1} \circ f \circ t_1 \circ h^{-1} \circ h \circ t_3 (x) = (t_2 \circ f^{-1}) \circ (f \circ t_1 \circ h^{-1}) \circ (h \circ t_3)(x),$$

where the parentheses ( ) indicate the different look-up tables and $\circ$ denotes function composition as usual.

When deriving a white-box implementation, there is a freedom of choosing the encodings. The following can be chosen arbitrarily:

The 128×128 linear bijections in the internal and external encodings.

The 8×8 mixing bijections that diffuse the inputs of the T-boxes.

The 32×32 mixing bijection that diffuses the output of MixColumns.

The nibble encoding bijections that are put on the tables.

In an aspect of the invention, this freedom can be used to modify a given look-up table in such a way that it contains a predefined set of bits or bytes. These predefined bits or bytes could comprise processor instructions to be executed. Tampering with these processor instructions will invalidate the table, and tampering with the table will invalidate the processor instructions. The predefined bytes are included in the tables by choosing the encodings mentioned above appropriately. As explained before, the effect of these linear mixing bijections and nibble encoding bijections is undone by inverse bijections incorporated in other tables.

In an embodiment, output encodings of a type II table are changed such that code is put into the table. The output encoding of a type II table comprises nibble encodings and a 32×32 mixing bijection. These and other embodiments described herein are not intended to limit the invention but rather to illustrate aspects of the invention. In a similar way code can also be put into other types of tables and, more generically, in any tables to which a transformation can be applied that can be undone by an operation subsequent or previous to the table look-up. The method disclosed herein can be adapted to such a situation by a skilled person. In the example, output encoding is used to force predefined code segments to appear in the table. The input encoding may be used in addition to properly position the predefined code segments at a predefined sequence of table entries. Any adaptations to the input encodings have to be compensated for by adapting the output encodings of the preceding table, as the input encoding of the code comprising table is an inverse of the output encoding of the preceding table.

The nibble encoding of each type II table can be chosen freely. However, the 32×32 mixing bijection can only be chosen once for each column of a round. Hence, four Type II tables share the same 32×32 mixing bijection MB. Either the nibble encoding or the 32×32 mixing bijection or both can be modified in a way that a desired code fragment appears somewhere in the table. The modification is compensated by properly modifying the input decoding of the next lookup table or lookup tables in the network.

First, a method is described to choose MB such that some predefined code appears in the table. This method will be referred to hereinafter as "algorithm for modifying MB". The input nibble decoding, the 8×8 mixing bijection, and the nibble output encoding F are kept fixed in principle, but may in some cases be modified to accommodate more codewords in the table. Since each nibble encodes 4 bits of the 32-bit table II output, the output nibble encoding F can be written as $(F_0, F_1, \ldots, F_7)$, where $F_i$ is the encoding of the ith output nibble.

Let X be a Type II table before encoding, incorporating the AES steps of MixColumns and T-boxes. The lookup table X, which consists of 256 rows of 32 bits, can be regarded as a 256×32 matrix. Row l of this matrix is given by $$\left(MC_i \cdot \begin{pmatrix} b_0(l) \\ b_1(l) \\ \vdots \\ b_7(l) \end{pmatrix}\right)^T,$$

where b(l) is the binary representation of the output of the T-box for value l and $b_i(l)$ is the ith bit in this representation. The rank of matrix X is 8. Hence, after, if required, rearranging the rows of X by for example appropriately choosing the input nibble decoding and/or the 8×8 mixing bijection, a 32×32 matrix A of full rank and a 24×8 matrix α can be computed, as will be understood by a skilled person, such that $$XA = \begin{pmatrix} I_8 & 0_{8 \times 24} \\ \alpha & 0_{24 \times 24} \end{pmatrix}, \qquad \text{(equation 1)}$$

where $I_n$ denotes the n×n identity matrix, $0_{n \times m}$ the n×m zero matrix with all entries zero. Let $C=(c(0), c(1), \ldots, c(7))$ be eight 32-bit words that represent a predefined sequence of instructions and let C be such that $$F^{-1}(C) = (F^{-1}(c(0)), F^{-1}(c(1)), \ldots, F^{-1}(c(7)))^T \qquad \text{(equation 2)}$$

are 8 independent 32-bit row vectors. If the row vectors of equation 2 are not independent, they may be made independent by appropriately modifying F. If it is undesirable to modify F or if not all eight $c(0), c(1), \ldots, c(7)$ are different, the method can still be applied. For example, a subset of $c(0), c(1), \ldots, c(7)$ for which the corresponding subset of equation 2 consists of independent vectors can be established and used. A 24×32 matrix β consisting of additional independent 32-bit row vectors can be computed by a skilled person such that a 32×32 matrix B of full rank is defined by $$B = \begin{pmatrix} F^{-1}(C) \\ \beta \end{pmatrix}.$$

Then an encoded version of X is obtained whose first 8 rows equal C by applying the mixing bijection given by MB= $(AB)^T$ and the (predetermined) nibble input encodings and nibble output encodings F. Let Y denote the lookup table representing the thus encoded version of X. It is a single look-up table incorporating, in a single look-up step, the composition of the (predetermined) input nibble decoding, (predetermined) 8×8 mixing bijection, T-boxes, MixColumns, MB, and (predetermined) output nibble encoding F. In comparison, the look-up table X only incorporates the composition of T-boxes and MixColumns.

The first eight rows of look-up table Y are given by C, as will be appreciated by considering the first row of Y, which is given by $$F\left(MB \cdot MC_i \cdot \begin{pmatrix} b_0(0) \\ b_1(0) \\ \vdots \\ b_7(0) \end{pmatrix}\right)^T = F\left(\left(MC_i \cdot \begin{pmatrix} b_0(0) \\ b_1(0) \\ \vdots \\ b_7(0) \end{pmatrix}\right)^T \cdot MB^T\right).$$

Because $$\left(MC_i \cdot \begin{pmatrix} b_0(0) \\ b_1(0) \\ \vdots \\ b_7(0) \end{pmatrix}\right)^T$$

is the first row of X and because the first row of XA is given by $(1, 0, 0, \ldots, 0)$, the first row of Y equals $F((1, 0, 0, \ldots, 0)B)$. By the definition of B this is $F(F^{-1}(c_0))$, which equals $c_0$. Similarly it holds that the second through eighth row of Y are given by $c_1, c_2, \ldots, c_7$.

It is noted that for computing A satisfying equation 1 it may be required to rearrange rows of X. This may be realized by modifying the input encoding. For type II tables, the input encoding comprises input nibble decoding and an 8×8 (linear) mixing bijection. For example, two rows may be swapped by swapping the output values of the nibble decodings corresponding to the two rows. It is not required that the code is put at the beginning of X. The code may also be put in another set of rows by properly modifying the input encoding and/or A and/or B. Furthermore, after positioning the code in the table as desired, there may still be freedom left in choosing the input encoding. This freedom may be used arbitrarily, for example to further obfuscate the table. This concludes the discussion of an example algorithm for putting code into a Type II table by choosing the mixing bijection in its output encoding.

For given input nibble decoding, given 8×8 mixing bijection, and given 32×32 mixing bijection MB, it is possible to modify the output nibble encoding F in such as way that code appears in the type II table. This possibility can be used in combination with the algorithm outlined above by, for example, first modifying MB such that eight 32-bit words of code appear in the table, and then modifying the output nibble encoding to add more 32-bit words of code. This will be explained in the following. As above, let X denote a type II table before encoding. The look-up table X thus only incorporates the composition of T-boxes and MixColumns. Furthermore, define MB(X) to be a lookup table obtained by applying mixing bijection MB on X. Row l of MB(X) is given by $$\left(MB \cdot MC_i \cdot \begin{pmatrix} b_0(l) \\ b_1(l) \\ \vdots \\ b_7(l) \end{pmatrix}\right)^T.$$

Let C be a collection of 32 bit words that represent the code to be put in the table. Let Z denote the version of MB(X) with output nibble encoding that is being created. An approach to incorporate 32-bit words of C into Z is by greedily adding words from C into Z until this is not possible anymore due to constraints outlined below, by modifying the output nibble encoding $F=(F_0, F_1, \ldots, F_7)$. The modification should be performed such that F remains a bijection, for example by swapping function values. In the following, subscripts will be used to indicate sequential 4-bit nibbles of a 32-bit word, for example $w_0, w_1, \ldots, w_7$ denote the 8 nibbles of a 32-bit word w.

Consider any 32-bit word c from C and any row of MB(X) holding a 32-bit word r. Initially, a random word c from C can be chosen, or the words c may be chosen from C in for example sequential order. The word c can be put in the row r of Z by defining $F_i(r_i)=c_i$ for $i=0, 1, \ldots 7$. Hereby, the mapping of one value has been fixed for each of the eight nibble encodings of F.

Next, another word c is chosen from C. Preferably the word c is chosen such that it has not already been incorporated in Z, and for which a row r exists in Z such that it is possible to realize $F_i(r_i)=c_i$ for $i=0, 1, \ldots 7$ by using the remaining freedom in specifying F, i.e., without changing the word(s) of look-up table Z already containing code. This is possible if for example $F_i(r_i)$ is not already assigned and if $c_i$ is not already assigned to a different nibble value, i.e., no nibble value $x \neq r_i$ exists with $F_i(x)=c_i$. This process is repeated until no words can be put in Z anymore. Again, the input nibble decoding and the 8×8 mixing bijection can be used to put the included instructions into the table at a proper position. The remaining freedom of the input nibble encoding, the 8×8 mixing bijection, and the output nibble encoding can be used arbitrarily for further obfuscating the table Z.

The algorithm for modifying MB and the algorithm for modifying the output nibble encoding can be combined for example to be able to include more words of code in the table compared to what is possible by using only one of the algorithms, or to be able to better obfuscate the table. One way of realizing this comprises the following steps. The algorithm for choosing MB is performed employing a fixed output nibble encoding F as set forth. This puts a first collection $C_1$ of words representing code into the lookup table Y via the choice of MB. Next, continuing with Y, the algorithm for choosing the output nibble encoding is applied to put a second collection $C_2$ of words representing code into the lookup table Z, where a value $F_i(x)$ is initialized as "not already assigned" if and only if $F_i(x)$ does not coincide with one of the codewords in the collection $C_1$ of words in look-up table Y already representing code. This initialization ensures that both collections of codewords $C_1$ and $C_2$ will appear in the table Z.

Suppose that a code fragment C is selected to be put into a table. In some cases, for example if the 32-bit words of C are not all independent, additional steps may be required to obtain the table comprising the code fragment. Some techniques can be applied to incorporate at least part of C into the table. Some examples of those techniques are:

a. A table does not have to be stored in a contiguous block of memory. For example, a plurality of tables can be stored in memory in an interleaved order. Other ways of merging the tables in memory are possible. For instance, the first row of a table T1 need not be followed by the second row of table T1. It can also be followed by the first row of a different table T2. As a result, the codeword that could not be included in T1 can be included in T2, and the words of T1 and T2 can be stored in memory in such an order that the code fragment C appears in a contiguous memory segment.

b. C can be transformed to a different but functionally equivalent code fragment. This can already be done by very simple techniques, such as changing the register allocation.

c. By inserting, for instance, NOP instructions (i.e., instructions that are skipped by the processor). Alternatively, other instructions may be inserted that together have no undesirable effect. If the NOP instruction is for example 8-bit and the codewords are 32-bits, the instructions following the NOP instruction are shifted by 8 bits. This results in a different collection C of 32-bit words to be included in the table. Two 32-bit words x and y that are equivalent are no longer equivalent if NOP is inserted before y. Note that by inserting a NOP before y, the last byte of y shifts to the next 32-bit word.

d. By code reallocation a problematic part of C can be moved to a different part of the program. At its new location, the problematic part need no longer be problematic.

Other ways to incorporate code or other predefined data in a obfuscated table or network of tables will become apparent to the skilled person after having understood this description. Other examples of tables that can be used are the type Ia table 100 and the type Ib table 500. The method can be applied successfully to all networks of look-up tables that can be obfuscated. The method can be successfully applied to any type of cryptographic algorithm, such as DES, AES, or Serpent, especially if implemented at least partly by means of look-up tables. The method is equally applicable to any method involving a plurality of look-up tables, where an output of a look-up table is an input for a next look-up table. The method also applies to any situation in which an operation implemented in a look-up table can be at least partly inverted by appropriately selected operations being performed before or after applying the look-up table. The method can also be applied to incorporate code in, for example, a matrix used to apply a linear operation, or to a fixed operand that is applied to data by means of a binary operation such as addition, multiplication, or XOR. In case of a matrix, the modifications to the matrix needed for incorporating the code may be compensated for by modifying or including a subsequent (linear) operation that is applied to the data. In case of a binary operation, the modifications to an operand may be compensated for by modifying an operand of a subsequent (binary) operation. The method proposed herein equally applies to other situations involving unifying code with numeric constants appearing in a method or algorithm. In an alternative embodiment, a plurality of look-up tables represent a cryptographic key, and the key is changed for including a predefined value in the look-up tables.

Figure 9:
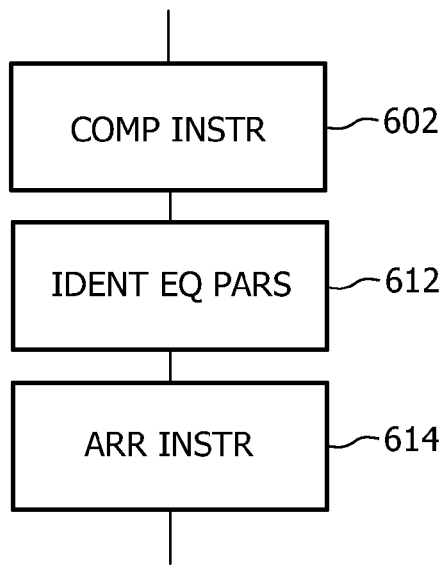
FIG. 9 is a flowchart illustrating processing steps.

FIG. 9 shows an illustrative diagram of a possible flow of operations required for creating a tamper resistant program capable of enforcing a digital rights management policy. In step 602, a program is composed of processor instructions, for example using a software development environment (SDE), also called a programming environment. For example, an editor and a compiler can be provided for performing this step. The program employs certain parameters for decrypting digital content. The parameters may relate to a key of a decryption algorithm underlying the program. For example, the key itself is a parameter, or a matrix representing a linear operation occurring within the program, or for example a look-up table representing a (possibly nonlinear) operation occurring within the program. Step 612 involves identifying a part of the parameters equal to bits of the program. For example, a bit representation of a parameter could also occur as a bit representation of a processor instruction of the program. The implementation is arranged in step 614 to reference that parameter value at the location of that processor instruction. This ensures that a change of that processor instruction by an attacker will result in an unwanted change of the parameter. This may cause a result of the decryption process to be unusable, which is desirable from a point of view of the content provider, because the content provider does not want his program to be tampered with. Of course, it is also possible to first identify 612 the equal part of the parameters (parameters having a bit representation equal to a bit representation of some instructions), and then compose 602 the program, and at the same time arranging 614 the program such that it references the coinciding part of the parameters at the location of the corresponding processor instructions. Other orders of actions are equally possible.

In step 604, a set of look-up tables is computed to function as the parameters to the program. The program uses the look-up tables to implement a mapping from an input value to an output value. A network of possibly obfuscated look-up tables may be employed by using an output of a first look-up table as an input for a second look-up table. An input value represented by a plurality of bits may be divided into a plurality of values each represented by some of the plurality of bits, and each value may be fed into one of the look-up tables. The results of the look-up tables may be combined in a single output value by for example XOR'ing the outputs, for example using obfuscated XOR look-up tables. The outputs may equally be combined in an other way, for example by means of generic look-up tables (i.e., look-up tables not implementing a XOR) or by concatenating the outputs.

In step 606, a word from the program code is selected for inclusion in the parameters, for example in the look-up tables. The word may be selected based on how critical a particular processor instruction is with respect to tamper resistance. The word may also be selected based on the fact that it is already present in the parameters or because it is particularly easy to incorporate it in the parameters/look-up tables.

In step 608, the selected word is, if not already present in the parameters, included in the parameters by applying an appropriate transformation. For example, an input and/or output encoding is changed such that the word appears at a predetermined location in a look-up table. In step 610, a compensating transformation is performed, for example by changing a corresponding output and/or input encoding, respectively, of preceding and/or succeeding look-up tables in the network of look-up tables. The step 612 of identifying a part of the parameters coinciding with a bit representation of program code may include checking whether the inclusion of a desired word in the parameters was successful. It may also simply be a result of the steps 604-610. It is possible to combine step 614 with step 602; for example the implementation can be arranged to address particular parameters at particular program code addresses; after that, the look-up tables are created and adapted in steps 604-612 to make sure the values occur in the parameters as the program expects.

Code as Counterpart of Key

An embodiment comprises selecting a plurality of words of the bit representation of the instructions and creating a look-up table that contains this bit representation of the instructions to form a 'code-containing' look-up table. The code-containing look-up table is included in a network of look-up tables forming parameters to a data processing program. Usually the effect of the code-containing look-up table is compensated for by including properly adapted look-up tables in the network of look-up tables. The instructions forming the program code are arranged such that the memory addresses holding the instructions appearing in the code-containing look-up table are also used for reading the values of the code-containing look-up table.

An embodiment further comprises applying a first set of look-up tables of the network to a string of bits of the digital data to obtain a first set of intermediate results. The same string of bits is also applied to the second set of look-up tables which includes the code-containing look-up table to obtain a second set of intermediate results. The first and second intermediate results are combined to compute the processed digital content. The second set of look-up tables may have an undesired effect because the contents of the instructions does not contribute to a proper processing of the data. That undesired effect is undone by adjusting the values in the first set of look-up tables and by properly combining the first and second intermediate results.

In an embodiment of the invention code is incorporated in one or more 'code-containing' look-up tables in a network of look-up tables, and their effect is undone by compensating the effect of the code-containing look-up table in the other tables. The structure of the network of look-up tables may be specially adapted for this. For example, one or more look-up tables can be added to the network, and existing connections can be changed compared to a network without code-containing look-up tables. A network of look-up tables is computed such that a code-containing look-up table is included in the network, and the network implements at least part of the data processing algorithm. This way, a relatively large portion of code can be stored in the parameters, and a high degree of tamper resistance may be achieved.

In an embodiment, tamper resistance is achieved by using code as a counterpart of the key. Let T be a look-up table containing k-bit words. Furthermore, let C be a collection containing an equal number of k-bit words representing code to be made tamper resistant. A new look-up table is defined by $T'=T \oplus C$, where $\oplus$ denotes the XOR operator. Since $T=T' \oplus C$, a look-up operation in table T can be replaced by a look-up in table T', a look-up in table C, and XOR'ing the result. An attacker wanting to change the code in C will have to make corresponding changes to T', because otherwise the look-up tables will not function properly.

Figure 11:
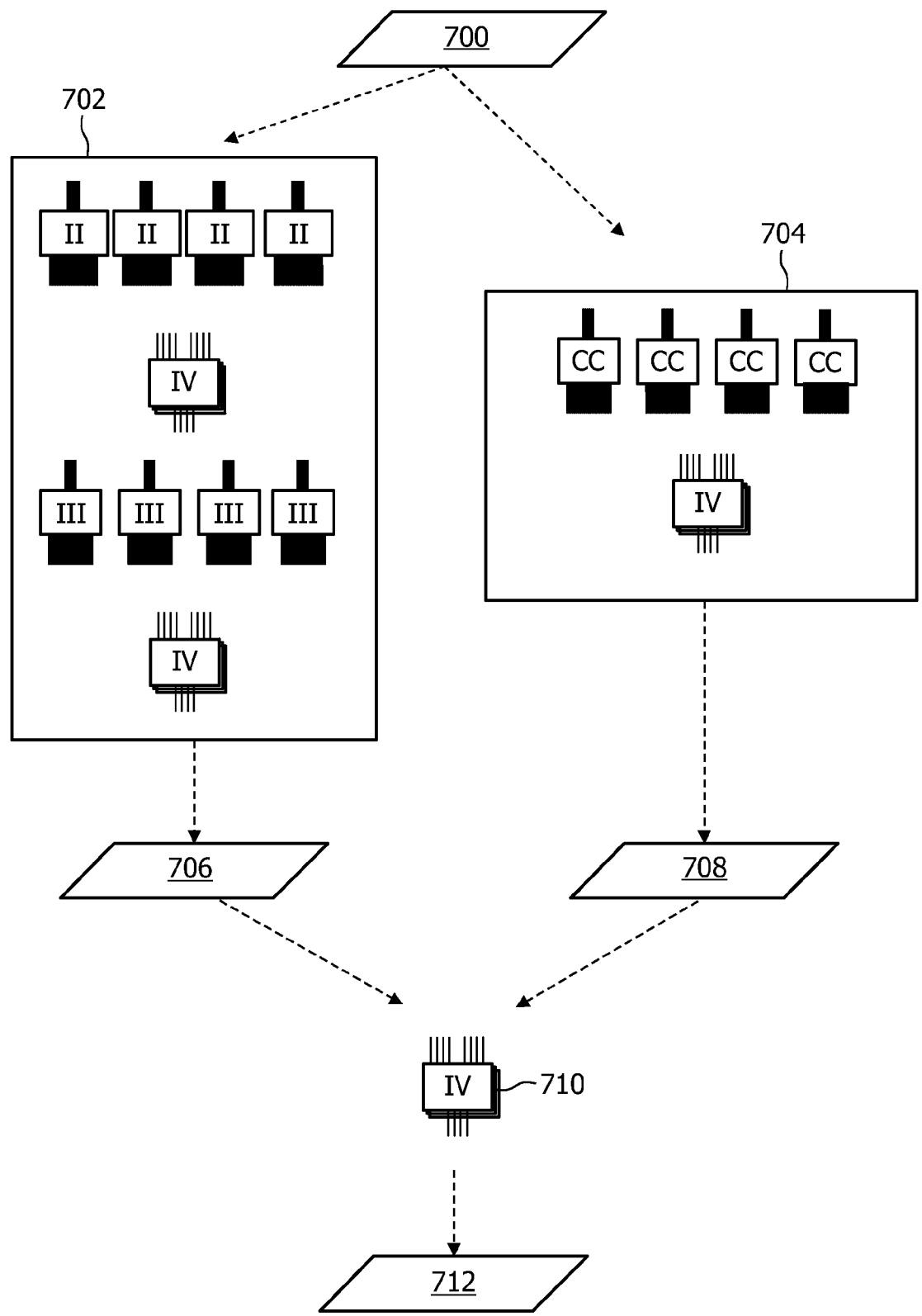
FIG. 11 is a diagram illustrating a network of look-up tables.

FIG. 11 illustrates an input word 700, for example a 32-bit word, that is applied to a network 702 implementing computations associated with a column of an AES state and a round of AES by means of type II, III, and IV tables as sketched by means of example. The network is obfuscated by means of mixing bijections and nibble encodings as set forth. Instead of the illustrated network, a network of look-up tables representing any part of any type of algorithm may be used. The network of look-up tables 702 combined with input 700 results in a word 706. The same input word 700 is also applied to a network of look-up tables 704 containing one or more code-containing tables CC. For example, in the case of 32-bit input, four 8-bit to 32-bit look-up tables CC can be provided, to provide storage for 4×256×4=4096 bytes of code. To use these four 8-bit to 32-bit look-up tables, the input is split into 4 bytes, each byte is applied to one of the look-up tables, and the results are combined using type IV tables to form the output word 708. As the network of look-up tables 702 may represent only part of the processing algorithm (in our example, the network 702 represents one round of AES for one column of the state), more code can be included in the parameters by creating code-containing tables 704 as counterparts to each of the networks 702 in the processing algorithm (in our example, one set of code containing tables 704 is included for each round of AES and for each column of the state).

The tables can also be organized differently. In the example, the network 702 is an obfuscated network of look-up tables similar to FIG. 3. The code containing network 704 may be extended by adding a layer of type III networks with corresponding type IV tables. It is also possible to replace the four 8-bit to 32-bit code-containing tables CC. For example, 8-bit to 8-bit tables may be used, and the 8-bit outputs may be concatenated to obtain 32-bit output word 708. Other ways of organizing the tables will be apparent to the skilled person and may require appropriately reorganizing the network 702. The network of look-up tables 704 can be designed with a large amount of freedom, as long as the network 702 is appropriately changed to undo its effect. The result of the network of look-up tables 704 is output word 708. The output words 706 and 708 are combined, for example using type IV look-up tables 710 to obtain the decrypted word 712. Instead of type IV networks 710, a simple XOR operation could be used or any other suitably chosen operator.

The tamper resistance is enhanced because it is relatively difficult for an attacker to compensate look-up tables 702 for changes made to the code-containing tables 704 (i.e.: changes made to instructions of the program code).

It is possible to add multiple code-containing networks similar to code-containing network 704 as counterpart to a single network of tables 702. The output words 708 of these code-containing networks 704 are all combined with word 706 by extending the network of type IV tables 710. To maintain a high degree of tamper resistance, the code-containing networks 704 may be extended with a layer of type III and type IV tables (e.g. implementing a mixing bijection) to scramble the output of the code-containing look-up tables. This extension may be omitted in at most one of the code-containing networks 704 without compromising the tamper resistance.

Figure 12:
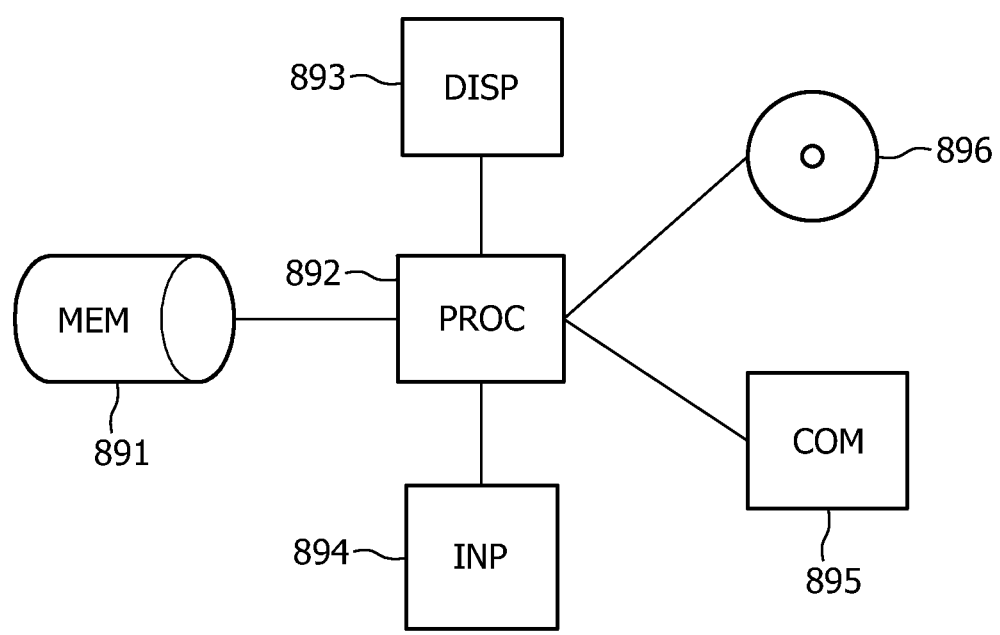
FIG. 12 is a diagram illustrating an embodiment.

FIG. 12 illustrates an embodiment of the invention. The Figure shows a communication port 895 such as a connection to the Internet for connecting with a provider of digital content. The content can also be obtained from medium 896 such as a DVD or CD. Digital content on the PC is typically rendered using media players being executed by processor 892 using memory 891. Such players can execute, for a specific content format, a respective plug-in for performing the format-specific decoding corresponding to content obtained via communication port 895 and/or medium 896. Those content formats may include AVI, DV, Motion JPEG, MPEG-1, MPEG-2, MPEG-4, WMV, Audio CD, MP3, WMA, WAV, AIFF/AIFC, AU, etc. For digital rights management purposes, a secure plug-in may be used that not only decodes the content but also decrypts the content. This plug-in comprises processor instructions and parameters (such as obfuscated look-up tables) stored in memory 891. The processor instructions and parameters may be overlapping as set forth; in that case, some memory locations in memory 891 contain a value representing both processor instruction and parameter value during execution of the plug-in. A user input 894 may be provided to obtain commands from a user to indicate content to be rendered, and display 893 and/or speakers are provided for rendering the decoded and/or decrypted content.

Tamper-Resistant Software

As described herein, look-up tables, at least partially in the form of program code, may form a partial evaluation of a user key used in a decryption process, for example in the form of round keys of a cipher. The cipher is preferably a block cipher, and more preferably is of the type known as AES or Lombok.

The invention may be applied to encryption or decryption algorithms in which a number of rounds are implemented.

Each round function of an exemplary encryption or decryption process such as AES or Lombok maps the output bits of a previous round (or initial input) to the input bits of a subsequent round (or final output).

The number of rounds may vary with each particular implementation. For example, AES uses 10, 12 or 14 rounds, whereas Lombok may use 16 rounds.

The size of the key may vary with each particular implementation. For example, AES may use a 128, 192 or 256-bit user key, while Lombok may use a 128 bit key. The key schedule used in a particular implementation may be in the form of an expanded key derived from a user key.

The following describes by example a particular implementation as applied to a Lombok cipher.

Lombok is a Feistel construction cipher consisting of 16 rounds. Each round is identical except for the value of the round key used and the absence of a swap in the final round. The operation of Lombok is similar to that of AES, in which a number of encryption/decryption rounds are implemented, between which are performed byte substitution, byte rotation and column mixing functions.

Figure 13:
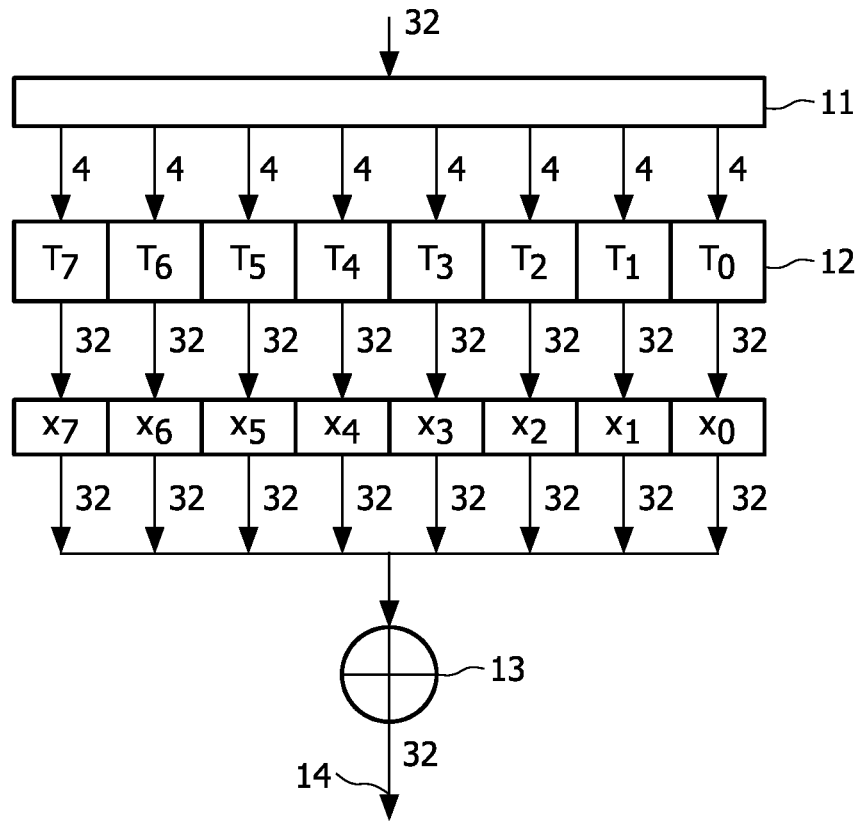
FIG. 13 illustrates schematically a round function as part of a block cipher encryption or decryption process.

The round function in Lombok maps a 32-bit input to a 32-bit output. A schematic representation of this implementation is shown in FIG. 13. The 32-bit input 11 is divided into 8 4-bit nibbles, each of which are inputted into 8 look-up tables 12. The tables $T_7$-$T_0$ each consist of 16 (=$2^4$) rows and 32 columns of bits and map the input 4-bit nibbles to corresponding 32-bit output words $x_7$-$x_0$. Each 4-bit nibble provides an address row, which defines the 32-bit output of the table $T_i$. The 32-bit output words $x_7$ to $x_0$ are bitwise XORed (represented by the symbol $\oplus$) at step 13, resulting in a single 32-bit output word.

For an arbitrary 32-bit word $a_i$, where $0 \leq i \leq 6$, since $a_i \oplus a_i = 0$, $$(a_0 \oplus x_0) \oplus (a_1 \oplus x_1) \oplus (a_2 \oplus x_2) \oplus (a_3 \oplus x_3) \oplus (a_4 \oplus x_4) \oplus (a_5 \oplus x_5) \oplus (a_6 \oplus x_6) \oplus$$
$$(a_0 \oplus a_1 \oplus a_2 \oplus a_3 \oplus a_4 \oplus a_5 \oplus a_6 \oplus x_7) =$$
$$x_0 \oplus x_1 \oplus x_2 \oplus x_3 \oplus x_4 \oplus x_5 \oplus x_6 \oplus x_7 \quad \text{(equation 3)}$$

Therefore, if all rows of each table $T_i$ are bitwise XORed with the corresponding value $a_i$ as above, the resulting output from the final XOR operation 13 will be the same as with using the tables without the incorporation of the values of $a_i$.

Each look-up table $T_i$ may be represented by a matrix of 32 columns and 16 rows, each element (bit) in the table being denoted by $t_{i,j,k}$, where i denotes the table number and j, k are the row and column indices respectively.

For each table $T_i$ where $0 \leq i \leq 6$, each element of the transformed table $T'_i$, as transformed by values $a_i$, now becomes $$t'_{i,j,p} = t_{i,j,p} \oplus a_{i,p} \quad \text{(equation 4)}$$

where $t'_{i,j,p}$ is the transformed element of table $T'_i$ and $a_{i,p}$ is the $p^{th}$ bit of 32 bit word $a_i$.

Since the values $a_i$ can be arbitrary, i.e. their value has no effect on the output 14 of the round function, these values may be chosen such that the values $t'_{i,0,k}$, where $0 \leq i \leq 6$, i.e. the elements of the first rows of each of the tables $T'_0$ to $T'_6$, correspond to bits representing the encrypting/decrypting program code itself. If the program code is represented by a series of bits $c_0$-$c_q$, where q is sufficiently large to provide enough bits to combine with the first row of each table, then the elements of table $T'_i$ are given by $$t'_{i,j,p} = t_{i,j,p} \oplus a_{i,p} \quad \text{(equation 5)}$$

for all j, where $$a_{i,p} = c_{p+32i} \oplus t_{i,0,p} \quad \text{(equation 6)}$$

Thus, the sequential bits $c_{p+32i}$ of the program form the bits in the first row of each table $T'_i$. In order to encode the table, given an arbitrary series of bits and a set of tables $T_0$-$T_7$, one need simply calculate the bytes $a_i$ based on the bytes in the first row of each table for $0 \leq i \leq 6$. Table $T'_7$ is then calculated based on the results for $a_0$-$a_6$, i.e.

$$t'_{7,j,p} = t_{7,j,p} \oplus a_{0,p} \oplus a_{1,p} \oplus a_{2,p} \oplus a_{3,p} \oplus a_{4,p} \oplus a_{5,p} \oplus a_{6,p} \quad \text{(equation 7)}$$

for $0 \leq j \leq 15$ and $0 \leq p \leq 31$.

In the way described above, the 8 tables of a single round can incorporate 7×32=224 bits of the program code. As there are 16 rounds in total, it is therefore possible to incorporate 3584 bits of the program code with the full key of one Lombok implementation.

In a general aspect, with a single round consisting of n tables, and where each round has a b-bit input byte, up to (n−1)b bits of the program code can be incorporated in each round key. For a total of r rounds, up to r(n−1)b bits of the program code can be incorporated in total.

The term 'byte' used throughout is intended to refer to a group of bits processed as one unit of data, the meaning not being restricted to a byte consisting of any particular number of bits, unless otherwise stated.

It is to be understood that the bits comprised in the program code need not be incorporated in the sequential order as stated above, but may for example be derived from any particular part of the program code or from selected parts of the code, and in any predetermined order. Such a portion of the program code may conveniently be termed c', and the process described above applied equally to this portion. Preferably, the part of the program code incorporated in the tables is that part which is essential for the operation of the encrypting or decrypting process, or otherwise controlling access and/or permissions, verification of a process, or restrictions on execution or handling computation that constitutes the functionality offered by the look-up tables.

Figure 14:
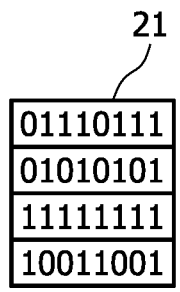
FIG. 14 depicts a sequence of program code.
Figure 15:
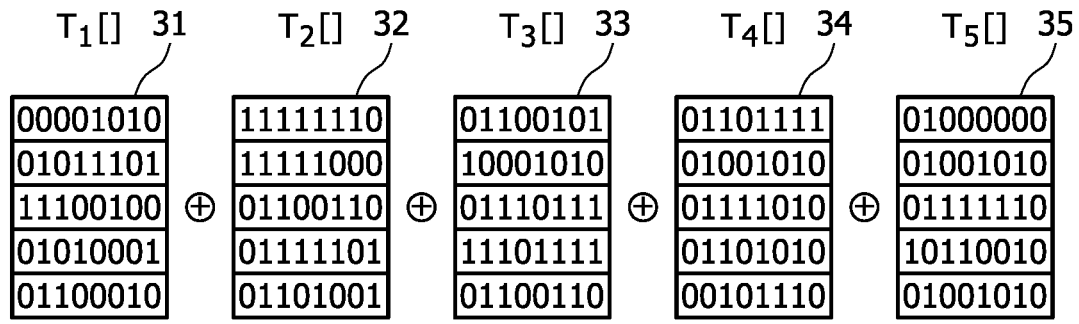
FIG. 15 shows examples of tables used in a computation.
Figure 16:
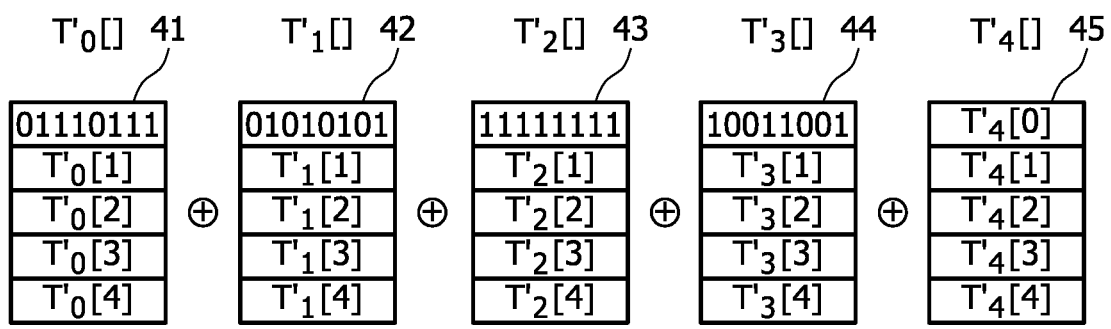
FIG. 16 shows tables used by the program code of FIG. 14 in which the tables contain the program code.

Illustrated by way of a simplified example, FIGS. 14 to 17 show various components of an implementation of the above process, instead using only 5 tables, each consisting of 5 rows of 8-bit bytes. In FIG. 14 a section of program code 21 in the form of four 8-bit bytes is shown, representing a portion c' of program code c as described above. FIG. 15 shows a series of five tables $T_0$ to $T_4$ 31-35, which implement a function of the program in question. Such a function may be cryptographic, in which case the tables may perform the function of round keys of a block cipher, although other functions dependent upon look-up tables are equally possible. FIG. 16 shows how individual bytes of the program code 21 are incorporated into the modified tables $T'_0$ to $T'_4$ 41-45, where the individual bytes in the program code 21 form the first row of each of the tables $T'_0$ to $T'_3$.

Following equation 6 above, the values for the bytes $a_i$ can be determined, given the program code 21 and the original tables 31-34.

$$a_0 = 01110111 \oplus 00001010 = 01111101$$

$$a_1 = 01010101 \oplus 11111110 = 10101011$$

$$a_2 = 11111111 \oplus 01100101 = 10011010$$

$$a_3 = 10011001 \oplus 01101111 = 11110110 \quad \text{(equation 8)}$$

The remaining values for the tables $T'_0$ to $T'_3$ 41-44 follow according to equation 5, by combining each row with the appropriate $a_i$ value. In table $T'_0$, for example, the values are given by combining the rows with $a_0$ as follows:

$$T'_0[1] = 01011101 \oplus 01111101 = 00100000$$

$$T'_0[2] = 11100100 \oplus 01111101 = 0011001$$

$$T'_0[3] = 01010001 \oplus 01111101 = 00101100$$

$$T'_0[4] = 01100010 \oplus 01111101 = 00011111 \quad \text{(equation 9)}$$

whereas the final table $T'_4$, following from equation 8 above, is given by the following:

$$\begin{aligned}
T'_4[0] &= a_0 + \oplus\ a_1 \oplus a_2 \oplus a_3 \oplus T_5[0] \quad \text{(equation 10)}\\
&= 01111101 \oplus 10101011 \oplus 10011010 \oplus\\
&\quad 11110110 \oplus 01000000\\
&= 11111010
\end{aligned}$$

$$\begin{aligned}
T'_4[1] &= a_0 + \oplus\ a_1 \oplus a_2 \oplus a_3 \oplus T_5[1]\\
&= 01111101 \oplus 10101011 \oplus 10011010 \oplus\\
&\quad 11110110 \oplus 01001010\\
&= 11110000
\end{aligned}$$

$$\begin{aligned}
T'_4[2] &= a_0 + \oplus\ a_1 \oplus a_2 \oplus a_3 \oplus T_5[2]\\
&= 01111101 \oplus 10101011 \oplus 10011010 \oplus\\
&\quad 11110110 \oplus 01111110\\
&= 11000100
\end{aligned}$$

$$\begin{aligned}
T'_4[3] &= a_0 + \oplus\ a_1 \oplus a_2 \oplus a_3 \oplus T_5[3]\\
&= 01111101 \oplus 10101011 \oplus 10011010 \oplus\\
&\quad 11110110 \oplus 10110010\\
&= 00001000
\end{aligned}$$

$$\begin{aligned}
T'_4[4] &= a_0 + \oplus\ a_1 \oplus a_2 \oplus a_3 \oplus T_5[4]\\
&= 01111101 \oplus 10101011 \oplus 10011010 \oplus\\
&\quad 11110110 \oplus 01001010\\
&= 11111000
\end{aligned}$$

Figure 17:
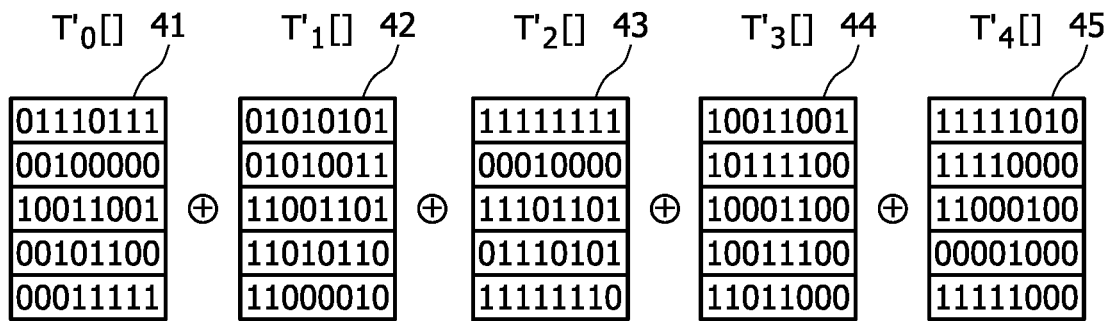
FIG. 17 shows an alternative form of the tables of FIG. 16.

The full set of tables $T'_0$ to $T'_4$ 41-45 are shown in FIG. 17. It can be seen that, when comparing the tables in FIG. 15 and in FIG. 17, the result of any XOR operation involving one byte from each and every table results in the same output for either set of tables, in accordance with equation 3, even though all the individual bytes in tables 41-45 are different to those in tables 31-35. The values for $a_0$ to $a_3$, and the original values in tables 31-35 are not immediately recoverable from tables 41-45. The program code 21 cannot be changed without altering at least some of the outputs of the look-up tables 41-45.

Figure 18:
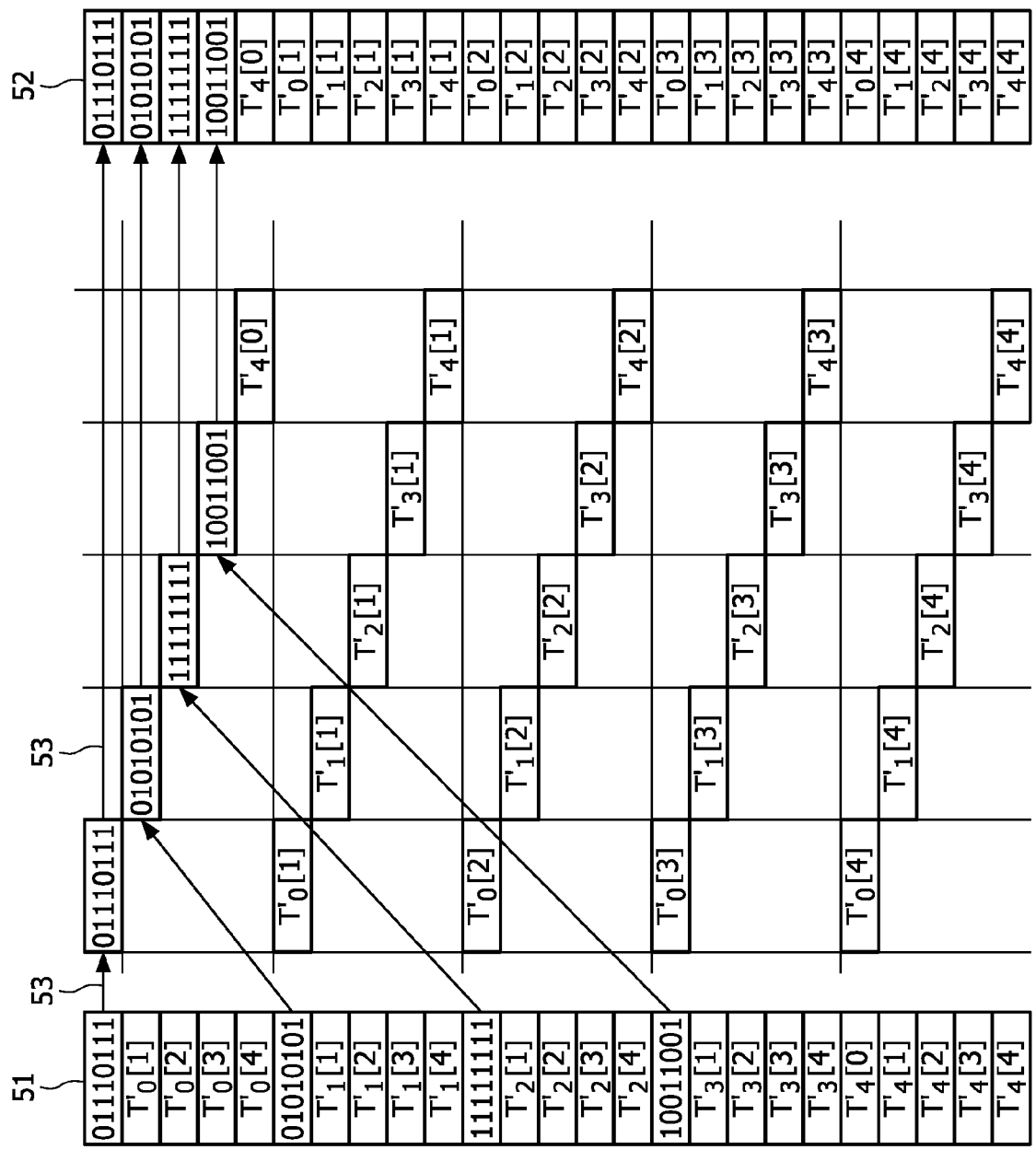
FIG. 18 shows a mapping of tables in computer memory.

FIG. 18 shows a schematic diagram where the bytes 51 of the combined program code and tables 41-45 are mapped to a preferred order of bytes 52 in computer memory. Arrows 53 indicate mapping operations of the bytes of program code.

The part of the program code 21 incorporated in the tables 41-45 may be a part that checks for permitted operations or implements restrictions on execution of a process. A possible example is a time check routine in the program code such that a key is valid for a limited time, dependent on a time stamp on an item. Access could then be granted to, for example, a rented video for a limited period of time, the video being encrypted by a key and decrypted in a player when operated with both the video and a smart card or other decryption key carrier. Another example may be a key in a telephone that verifies whether the number being called is permitted.

It is to be understood that it is not necessary to incorporate the program code into all of the round keys and/or all the tables of a single round of the cipher chain, since each block of the cipher chain is essentially independent. The aim of the invention is still achieved, though to a lesser preferred extent, with not all look-up tables incorporating bits of the program code. Following the principles given above, a particular embodiment will lie within the scope of the invention provided that the final XOR operation of the outputs from each of the tables $T'_i$ causes the bytes $a_i$ to be cancelled from the operation, resulting in the output byte being the same for any given input byte as that achieved using the initial tables $T_i$.

The previous specific example is directed towards the implementation of the invention within the Lombok cipher. However, with appropriate changes made, the invention can be made to apply equally to other programs that may use similar tables in a computation, and is not limited to applications involving block cipher operations. For example, tables used in other data processing applications may use outputs consisting of various numbers of bits. Other than powers of 2, such as $2^5$ or $2^7$ in the case of Lombok or AES, formats such as IDCT (Inverse Discrete Cosine Transform) comprising 18 bit outputs may also be used in accordance with the invention.

An executable program code comprising the features described above will be resistant to tampering, in that any alteration to the portion of the program code forming the look-up tables will inevitably alter the function constituted by the look-up tables.

In the case where the look-up tables are a partially-evaluated key, an alteration of the program used to perform the encryption or decryption function will invalidate the key.

Figure 19:
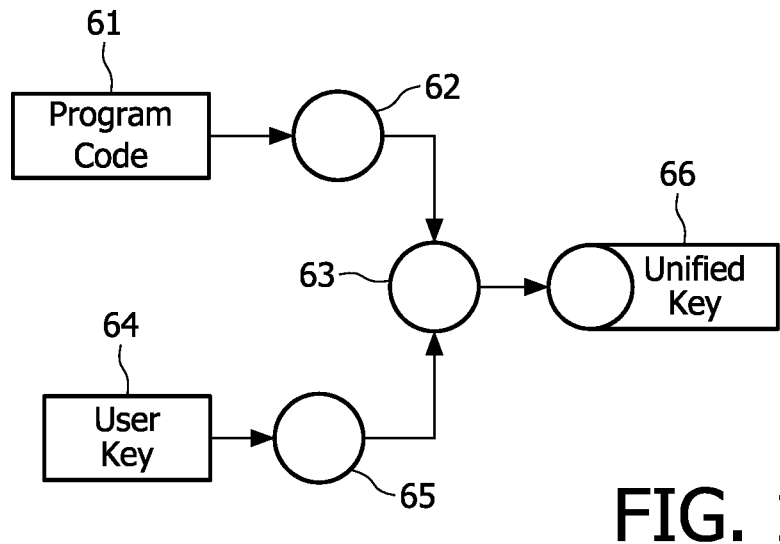
FIG. 19 illustrates a schematic diagram of the merging of an executable program and a key for providing conditional access for a user to encrypted data.

The program code thus altered to be in the form of a unified key and program can provide the basis for an executable program or plug-in component that is able to provide conditional access for a user to encrypted data. Shown in FIG. 19 is a schematic diagram of the operation of producing such a unified key, and in FIG. 20 the operation of such a key/program. The program code 61 is compiled at step 62 into a series of bits. The user key is transformed into a series of tables at step 65. These two outputs are combined at step 63 to form a unified key 66. Instead of a user key 64, the unified key 66 is provided to a user as a result of, for example, payment of a use fee for data.

Figure 20:
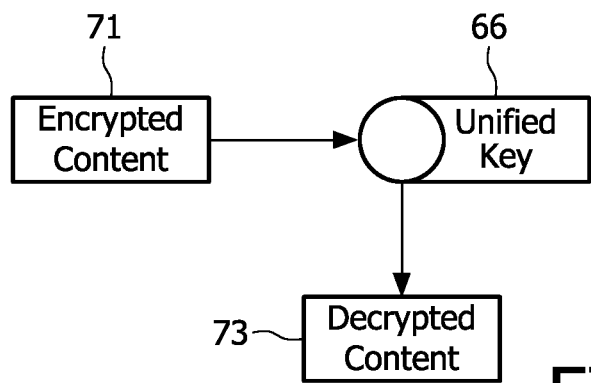
FIG. 20 illustrates a schematic diagram of the use of a unified key for providing conditional access to encrypted content.

In FIG. 20, the unified key 66 is used both as program and key, combining the key with encrypted content 71 to produce decrypted content 73 to the user.

Since the program code is protected from tampering by the process as aforementioned, it is very difficult for the user to overcome the protection measure provided by the user key, since any modification of the program code 61 would result in the unified key 66 becoming invalid.

In a general aspect, partial evaluation of key and decryption code gives rise to code and data that decrypts the content without losing the key. Surprisingly, if it is a partial evaluation of a key with a decryption algorithm like Lombok or AES then the result of the evaluation is data and code that conform to the required rules and therefore can be transformed into a unified code and data (key) form.

A program may use look-up tables (as it does in the cases of DES, Lombok and AES) which are chained by a combining operation (indicated by $\oplus$) to compose a result, like:

$$T_0[x_0] \oplus \ldots \oplus T_n[x_n]$$

where n is a sufficiently large natural number and where the operator $\oplus$ and the class of values of $T_i$ answer to $$\forall x,y : x \oplus y = y \oplus x$$

$$\forall x,y,z : (x \oplus y) \oplus z = x \oplus (y \oplus z)$$

$$\forall x \exists x^{-1} : x \oplus x^{-1} = e$$

then these tables have the ability to incorporate program code of length at most k, $c_0; \ldots ; c_k$, where k<n, with a consequence being that altering any part of the code results in loss of functionality of the chained table (being the key in the case of encryption or decryption).

It is to be understood that, beside the XOR operation, other combining operations such as addition, subtraction or multiplication (if no value in T is 0) also answer to the prerequisites mentioned above.

Notation: $T^{\oplus v} : \forall i \in dom(T) : T^{\oplus v}[i] = T[i] \oplus v$ Let m be fixed in dom(T)
Then $$T_0[x_0] \oplus \ldots \oplus T_n[x_n]$$

$$=$$

$$T'_0[x_0] \oplus \ldots \oplus T'_{n-1}[x_{n-1}] \oplus T'_n[x_n]$$

where $$\forall i : 0 \leq i < n : T'_i[x] = T_i^{\oplus (T_i[m]^{-1} \oplus c_i)}[x]$$

$$T'_n[x] = T_n^{\oplus ((T_0[m] \oplus c_0) \oplus \ldots \oplus (T_{n-1}[m] \oplus c_{n-1}))}[x]$$

Now note that a program is always a sequence of $c_0; \ldots ; c_{n-1}$. For a certain m we now have $$\forall i : 0 \leq i < n : T_i^{\oplus (T_i[m]^{-1} \oplus c_i)}[m] = c_i$$

but they are not yet in a consecutive order. By creating a new $$T''[(x \cdot n) + i] = T'_i[x]$$

we find that the values $c_0; \ldots ; c_{n-1}$ are mapped in the order we would like.

The replacement of T by T'' in a program could influence the program length in terms of code size. But in this case it doesn't since computing $T_j[x_i]$ (computed as address($T_0$)+ j·size(T)+$x_i$) shows instruction wise no difference with T''[($x_i$·n)+i] (computed as address(T'')+$x_i$·n+i).

It is to be understood that the above is only one of many ways of combining the program code with the tables. Variations could, for example, encompass spreading the code over more rows of each table, or using a different table to $T'_n$ for cancelling out the consequences of the other table outputs. The modules of the code could also be distributed non-consecutively over the key.

For the avoidance of doubt, it is to be understood that the term "table" referred to throughout is intended to encompass representations of data or code in any suitable structured form, whether in computer memory or stored otherwise in an addressable physical medium such as a disc, and not merely when represented in a two-dimensional format such as is shown throughout for reasons of clarity.

Other embodiments are intentionally within the scope of the appended claims.

In the description above, and with reference to the Figures, there is described a method of incorporating program code into look-up tables, comprising the steps of: providing a program code 21 comprising a plurality of program bits; providing a first plurality of look-up tables Ti 31-35, each look-up table for mapping a portion of an input byte to an output byte; and combining a plurality of elements of one or more of the look-up tables Ti with a series of bytes ai to generate a second plurality of look-up tables T'i 41-45, the series of bytes being selected such that predetermined portions of the second look-up tables contain at least a portion of the program code, and such that a combination of the output bytes from each of the second plurality of look-up tables is the same for any given input byte as that achieved using the first plurality of look-up tables.

Protecting an Integrity of a Data Processing System

In the foregoing, the emphasis has been on incorporating code in a network of look-up tables. However, using the same methods, it is possible to incorporate any predefined data string in the network of look-up tables. Moreover, a network of look-up tables is a mere example of a set of parameters representing a data processing function. The code, or any predefined data string, may be incorporated in a bit representation of the set of parameters, in particular if the set of parameters is sufficiently redundant. This means that a single data processing function can be represented by any one of a plurality of different sets of parameters, including at least one set of parameters of which a bit representation includes the data string.

Figure 21:
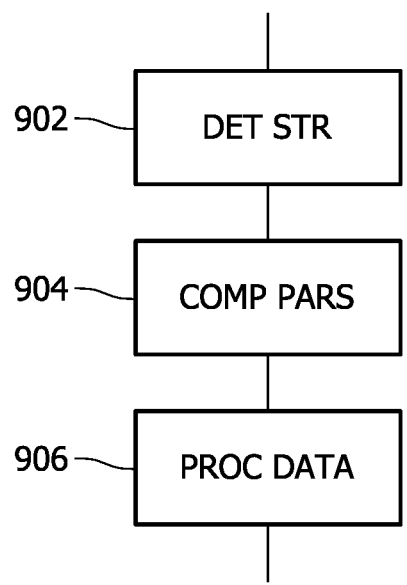
FIG. 21 illustrates processing steps.

FIG. 21 illustrates processing steps of a method of protecting an integrity of a data processing system. The data processing system comprises, for example, a software application or a set-top box or a smart card. The data processing performed by the data processing system comprises for example encryption, decryption, or authentication of the data. The data can be any kind of data. For example, the data comprises an audio or video stream.

The method comprises, as illustrated in block 902, determining a data string to be protected. This data string is for example a character string or a byte string representation of any data requiring protection. The data string comprises for example a sequence of processor instructions occurring in software in the system. Especially processor instructions involved in digital rights management are often subject to tampering, and are a suitable object for protection. Other data strings include for example a hardware identifier of the system. Such a hardware identifier comprises for example a hard-disk identifier, a MAC address of a network interface, or a CPU identifier. Preferably, the data string comprises both the hardware identifier itself and the processor instructions involved in retrieving the hardware identifier. The data string may for example comprise data used in a challenge/response protocol. For example, a challenge message is sent by the system to a server that returns a response message. Either or both of the challenge message and/or the response message may be incorporated into the data string to be protected. Also, a plurality of data strings may be determined for protection. For example, a plurality of processor code segments may be included in separate strings. Also, different types of data may be protected via different data strings. The integrity of the data string should be an indication of the integrity of the data processing system. Preferably the data string is selected from data available in the system. If the string is changed, then the system is itself changed. The data string to be protected may also be derived from information relating to the system, such as a hardware identifier or processor instructions or a message in a challenge/response protocol.

The method comprises, as illustrated in block 904, computing a set of parameters representing a predetermined data processing function. The data processing function preferably is fully determined, i.e. the data processing function can be used to process data without requiring any further information. For example, the data processing function is a decryption algorithm with a particular key. The same decryption algorithm with another key would result in a different data processing function. Determining the data processing function could include determining a decryption algorithm (for example DES or AES) and determining a cryptographic key to the algorithm. Alternatively, the data processing function could also provide an enhancement of the processed data such as enhanced contrast or enhanced white balance. The set of parameters has a redundancy in it. A plurality of different sets of parameters could be used to represent the same data processing function (for example: different sets of parameters could be used to represent the same cryptographic key). These different sets of parameters are compatible with the system, which means that the system, when provided with any one of the sets of parameters, is arranged for processing data according to the data processing function. When computing the set of parameters, they are computed according to properties of the system, such that the system, when provided with that set of parameters, is thereby arranged for processing data according to the data processing function, and such that a bit representation of the set of parameters comprises the data string to be protected. Several ways to incorporate the data string into a bit representation of the set of parameters have been described in the foregoing for the case that the set of parameters comprises at least part of a network of look-up tables. Although a network of look-up tables is very suitable for use as a set of parameters, it is not the only possibility. Redundancy can be introduced in many other ways. For example, the data processing function may involve computing a hash function of the set of parameters. Having the proper knowledge of and control over the hash function, it would be possible for a person skilled in the art, having taken due account of this description, to incorporate the data string to be protected into the set of parameters by making use of the redundancy therein, without changing the hash function result and therefore without changing the outcome of the data processing function.

The method comprises, as illustrated in block 906, enabling the system to process data according to the set of parameters. This step can be implemented in many different ways. The system needs processing hardware and/or software to input data, process the data according to the set of parameters, and output the data. This has been explained with reference to FIG. 12. This also involves providing the system with access to the set of parameters. In one example, the complete set of parameters is hard-coded in the system. For example, the parameters are stored in a memory or storage medium. The data string to be protected is stored in the storage medium, and preferably has a double function, for example the same memory location is used both as a location where one or more processor instructions are stored and as a location where a portion of the set of parameters is stored, a bit representation of the processor instructions being equal to a bit representation of the portion of the set of parameters. If the data string to be protected comprises a hardware identifier, usually the data string is not permanently stored in the memory or storage medium. Rather, the system comprises code to obtain the identifier from the particular piece of hardware. Advantageously this piece of code is also a protected data string.

In another example, a portion of the set of parameters is provided from an external source, such as a broadcasting medium or via a telephony network, the Internet, or a removable storage medium. In some cases a portion of the set of parameters is provided from an external source, for example a smart card or a server, via a challenge/response protocol. Another portion of the set of parameters is stored in the system as described above. In most embodiments, the system is only able to process the data when it has access to the complete set of parameters. In another example, the complete set of parameters is provided from an external source.

Figure 22:
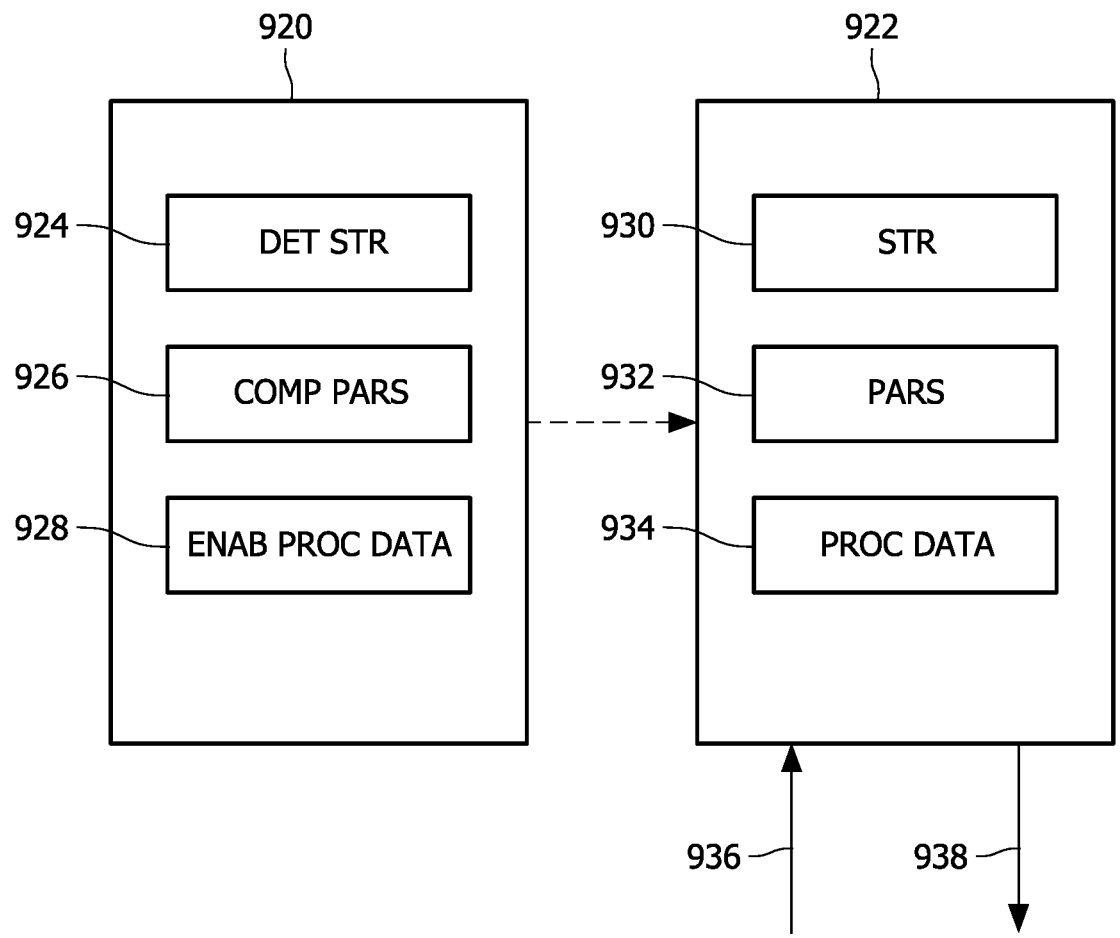
FIG. 22 depicts a diagram of an embodiment of the invention.

FIG. 22 illustrates an embodiment of the invention. The figure shows a first system 920 for protecting an integrity of a second system 922. The first system comprises a string determiner 924 for determining a data string 930 to be protected in the way set forth. An integrity of the data string forms an indication of the integrity of the second system. The first system 920 comprises a parameterizer 926 for computing a set of parameters 932 representing a predetermined data processing function, using a redundancy in the set of parameters to incorporate the data string into a bit representation of the set of parameters. The first system 920 also comprises a means 928 for enabling the second system to process data according to the set of parameters. In some embodiments, the means 928 has an impact on the implementation of the second system 922. In some embodiments, the means 928 communicates with the second system 922 to provide the second system 922 with information enabling it to perform the processing. For example, the means 928 transmits or causes a transmission of at least part of the data string 930 and/or at least part of the set of parameters 932. The system 920 can be implemented in hardware and/or software.

The second system 922 is a data processing system. It comprises a memory 930 for storing a data string to be protected. An integrity of the data string forms an indication of the integrity of the data processing system. The second system 922 also comprises a memory 932 for storing a set of parameters representing a predetermined data processing function. The two memories 930 and 932 may be partially or completely overlapping. The system 922 may copy the data string and/or the set of parameters from an internal or external source into the memories 930 and 932. The data string is incorporated into a bit representation of the set of parameters using a redundancy in the set of parameters. The second system also comprises a processing module 934 for processing data via a data input 936 according to the set of parameters 932, to provide processed data via a data output 938. For example, the input 936 is connected to a broadcasting network, and the output 938 is connected to a video input of a television. The second system 922 can be implemented in hardware and/or software.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of protecting an integrity of a data processing system, the method comprising:
    determining a data string to be protected, an integrity of the data string being an indication of the integrity of the data processing system, the data processing system processing data according to a cryptographic algorithm;
    computing a network of look-up tables for implementing the cryptographic algorithm including a cryptographic key using a redundancy in the look-up tables so that the data string is incorporated into two or more of the look-up tables; and
    enabling the system to process the data using the network of look-up tables, wherein a change of the data string in the network of look-up tables causes the system to lose its capability to process the data according to the data processing function.

2. The method according to claim 1, wherein the look-up tables are chained by a combining operation including either one or more of addition, subtraction and multiplication.

3. The method according to claim 2, wherein the network of look-up tables comprises a plurality of look-up tables of a white-box implementation of a cryptographic algorithm.

4. The method according to claim 1, further comprising:
    providing the system with the network of look-up tables except the data string to be protected; and
    enabling the system to obtain the data string from an execution environment of the system.

5. The method according to claim 1, further comprising:
    providing the system with the network of look-up tables except the data string to be protected; and
    enabling the system to obtain the data string by means of a challenge/response protocol.

6. The method according to claim 1, further comprising enabling the system to derive the data string from computer executable code that is part of the system.

7. The method according to claim 6, wherein the computer executable code comprises at least part of a set of instructions for establishing an authenticity of the system or for enforcing permissions control.

8. The method according to claim 1, wherein the data string to be protected comprises a representation of at least one of:
    a hardware identifier,
    part of content to be processed,
    computer executable code,
    processor instructions,
    a password, and
    a response that the system is arranged to obtain by a challenge/response protocol.

9. The method according to claim 1, wherein the computing comprises:
    providing a second plurality of look-up tables for collectively performing a white-box implementation of the cryptographic algorithm, each second look-up table for mapping a portion of an input byte to an output byte; and
    combining a plurality of elements of one or more of the second look-up tables with a series of bytes to generate the plurality of look-up tables, the series of bytes being selected such that two or more of the look-up tables contain two or more portions of the data string to be protected, respectively, and such that a combination of the output bytes from each of the plurality of look-up tables is the same for any given input byte as that achieved using the second plurality of look-up tables.

10. The method according to claim 9,
    wherein the data string to be protected is at least a portion of a program code.

11. The method according to claim 1, wherein the computing comprises:
    selecting at least one word of the data string to be protected for inclusion in at least one of the look-up tables;
    including the word in the at least one of the look-up tables by applying a transformation to elements of the look-up table; and
    compensating for the transformation by applying, to elements of at least one of the other look-up tables, a compensating transformation inverting an effect of the transformation to elements of the look-up table.

12. The method according to claim 11, wherein the data string to be protected is a bit representation of computer executable code.

13. The method according to claim 11, further comprising:
    arranging an output encoding of a first look-up table, in the network of look-up tables and an input decoding of a second look-up table in the network of look-up tables, the input decoding inverting an effect of the output encoding such that the selected word is included in at least one of: the first look-up table and the second look-up table.

14. The method according to claim 13, wherein the selected word is included in the first look-up table, the method further comprising arranging an output encoding, for example h, of a third look-up table in the network of look-up tables and an input decoding of the first look-up table, for example the input decoding of the first look-up table inverting an effect of the output encoding of the third look-up table for positioning the selected word in the first look-up table.

15. The method according to claim 1, further comprising enabling the system to:
    apply a first set of look-up tables of the network to a string of bits of the digital data to obtain a first set of intermediate results;
    apply a second set of look-up tables of the network to the string of bits of the digital data to obtain a second set of intermediate results, a bit representation of the second set of look-up tables including the data string to be protected;
    combine the first and second intermediate results for obtaining a third intermediate result; and
    compute processed digital data based on the third intermediate result.

16. A first system for protecting an integrity of a second system, the first system comprising:

a string determiner for determining a data string to be protected, an integrity of the data string being an indication of the integrity of the second system, the second system processing data according to a cryptographic algorithm;

a parameterizer for computing a network of look-up tables for implementing the cryptographic algorithm including a cryptographic key, using a redundancy in the look-up tables so that the data string is incorporated into two or more of the look-up tables; and a processor configured to enable the second system to process data according to the network of look-up tables, wherein a change of the data string in the network of look-up tables causes the system to lose its capability to process the data according to the data processing function.

17. A non-transitory computer program storage medium storing one or more programs, the one or more programs comprising instructions, which when executed by a processor, cause the processor to perform the method according to claim 1.

18. A data processing system comprising
a memory for storing a data string to be protected, an integrity of the data string being an indication of the integrity of the data processing system;

a memory for storing a network of look-up tables for implementing the cryptographic algorithm including a cryptographic key, the data string being incorporated into two or more of the look-up tables by using a redundancy in the look-up tables; and a processing module for processing data according to the network of look-up tables, wherein a change of the data string in the network of look-up tables causes the system to lose its capability to process the data according to the data processing function.

19. A non-transitory computer program storage medium storing one or more programs, the one or more programs comprising instructions, which when executed by a processor, causes the processor to process data according to a network of look-up tables for implementing the cryptographic algorithm including a cryptographic key, an integrity of a data string to be protected being an indication of an integrity of the computer program product, the data string being incorporated into two or more of the look-up tables using a redundancy in the look-up tables, wherein a change of the data string in the network of look-up tables causes the system to lose its capability to process the data according to the data processing function.

20. The method according to claim 1, comprising:
storing, in a memory having a double function, the data string at a location same as that of a portion of the network of look-up tables.

21. The data processing according to claim 18 wherein the memory has a double function for storing the data string at a location same as that of a portion of the network of look-up tables.

* * * * *